US008104552B2

(12) United States Patent
Papke et al.

(10) Patent No.: US 8,104,552 B2
(45) Date of Patent: Jan. 31, 2012

(54) CONTROL SYSTEM AND VEHICLE INCORPORATING SAME

(75) Inventors: Clark S. Papke, Cortland, NE (US); Justin L. Pryor, Firth, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 13/082,933

(22) Filed: Apr. 8, 2011

(65) Prior Publication Data
US 2012/0000173 A1  Jan. 5, 2012

Related U.S. Application Data

(63) Continuation-in-part of application No. 12/827,269, filed on Jun. 30, 2010.

(51) Int. Cl.
*B62D 11/00* (2006.01)
*B62D 11/02* (2006.01)
(52) U.S. Cl. ..................... 180/6.48; 180/19.3
(58) Field of Classification Search .............. 180/6.48, 180/19.3, 19.1, 135, 6.2; 56/10.2 A, 17.1, 56/14.7
See application file for complete search history.

(56) References Cited

U.S. PATENT DOCUMENTS

| | | | | | |
|---|---|---|---|---|---|
| 6,098,385 | A | * | 8/2000 | Turk .............................. | 56/11.3 |
| 6,105,348 | A | * | 8/2000 | Turk et al. ..................... | 56/10.5 |
| 6,155,033 | A | * | 12/2000 | Wians et al. ................... | 56/11.1 |
| 6,301,864 | B1 | * | 10/2001 | Damie et al. ................... | 56/11.3 |
| 6,557,331 | B2 | * | 5/2003 | Busboom et al. ............. | 56/10.8 |
| 6,640,526 | B2 | * | 11/2003 | Velke et al. .................... | 56/10.8 |
| 6,688,090 | B2 | * | 2/2004 | Velke et al. .................... | 56/14.7 |
| 6,729,115 | B2 | * | 5/2004 | Bartel ............................ | 56/11.3 |
| 6,912,831 | B2 | * | 7/2005 | Velke et al. .................... | 56/10.9 |
| 6,951,092 | B2 | * | 10/2005 | Busboom et al. ............. | 56/10.8 |
| 6,968,687 | B1 | * | 11/2005 | Poplawski et al. ............ | 60/487 |
| 7,213,662 | B2 | * | 5/2007 | Crumly ......................... | 180/6.48 |
| 7,325,388 | B2 | * | 2/2008 | Wright et al. ................. | 56/17.1 |
| 7,607,283 | B2 | * | 10/2009 | Wright et al. ................. | 56/17.1 |
| 7,647,754 | B2 | * | 1/2010 | Velke et al. .................... | 56/10.8 |
| 2001/0001170 | A1 | * | 5/2001 | Velke et al. .................... | 56/14.7 |
| 2010/0126792 | A1 | * | 5/2010 | Kallevig ........................ | 180/315 |

* cited by examiner

*Primary Examiner* — Arpad Fabian-Kovacs
(74) *Attorney, Agent, or Firm* — Mueting, Raasch & Gebhardt, P.A.

(57) ABSTRACT

A vehicle including a linkage-based motion control system for varying a parameter (e.g., velocity) of the vehicle as a geometric relationship between a vehicle input (e.g., velocity control lever) and a vehicle output (e.g., drive train) is modified. In one embodiment, the control system provides a linkage that allows a fixed level of input applied to the control lever to produce a repeatable output to a variable drive unit even as the drive unit is moved relative to the control lever.

20 Claims, 18 Drawing Sheets

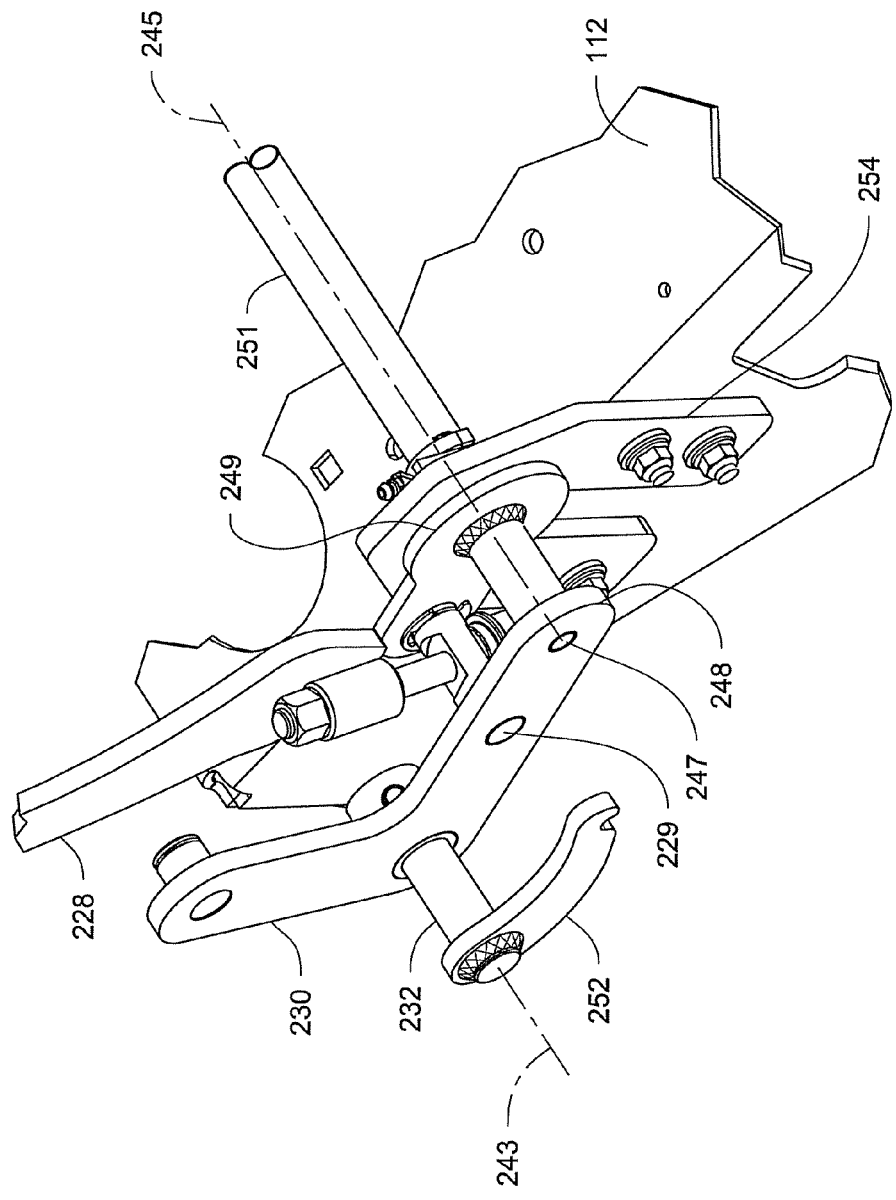

CONTROL SYSTEM AND VEHICLE INCORPORATING SAME

RELATED APPLICATION(S)

This application is a continuation-in-part of U.S. application Ser. No. 12/827,269, filed Jun. 30, 2010, the content of which is incorporated herein by reference in its entirety.

TECHNICAL FIELD

Embodiments of the present invention relate generally to motion control systems and, for example, to vehicles (e.g., lawn mowers) and motion control systems for accommodating relative movement between a working and a fixed portion of the vehicle.

BACKGROUND

Power vehicles for carrying out diverse tasks are known. For instance, power lawn mowers are well known for use in turf and lawn maintenance. Such mowers may range from small, walk-behind mowers such as those used by homeowners, to professional grade riding mowers adept at mowing larger areas. While embodiments of the present invention may be directed to control systems for use with a wide variety of power vehicles, it will, for the sake of brevity, be described with respect to power riding or walk-behind mowers.

Power mowers typically incorporate a prime mover (e.g., internal combustion engine) and a variable, e.g., hydraulic, drive system. The drive system may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be controlled by associated drive control levers manipulated by an operator. By manipulating the control levers independently, each drive wheel can be separately driven forward or backwards at varying speeds. Thus, the mower may be propelled forwardly or in reverse. By powering one wheel in the forward direction and slowing, stopping, or powering the opposite wheel in the reverse direction, the mower can execute a turn.

With many conventional mowers, the engine and hydraulic pumps are attached to a frame of the mower, while the cutting deck is adjustably positionable at varying elevations relative to the frame to provide for different cutting heights. While effective, moving the cutting deck relative to the engine does have drawbacks. For example, with a belt-powered cutting deck, it is desirable to ensure that the fleeting angle (the belt angle formed between the engine driving sheave and the driven sheave(s) of the cutting deck) is maintained within an acceptable range as the deck moves up and down to minimize belt separation and/or wear. Depending on the distance between the engine and deck, the range of acceptable fleeting angles may be limited.

Another issue with some mowers concerns positioning of the drive control levers. For instance, each drive control lever may generally be positioned between a neutral and a full forward (and a full reverse) position. The levers are generally sized and configured so that the operator may manipulate the levers over their normal range of motion (e.g., from neutral to full forward) without relocating his or her hands. In the full forward position, the levers may be configured to rest against stationary stop bars. Such a configuration permits the operator to hold the levers against a fixed stop during normal operation, reducing potential fatigue in the hands, wrists, and arms. The fixed stop may also provide a degree of lever stability, minimizing inadvertent lever movement as a result of vehicle motion.

While effective, this full forward position may result in a vehicle speed in excess of what is desired for some mowing tasks. To reduce the speed, the operator may back the control levers off from the full forward position. Unfortunately, this technique may prevent the operator from resting the levers against the fixed stops. Alternatively, the engine throttle may be reduced. While throttle reduction is effective at reducing maximum vehicle speed, it also reduces the rotational speed of any attached implements, e.g., the blades of the cutting deck. As a result, cutting efficiency of the mower may be reduced.

SUMMARY

The present invention may overcome these and other issues with prior art mowers by providing, in one embodiment, a vehicle including: a chassis; a platform suspended from the chassis; and a platform displacement mechanism configured to move the platform, relative to the chassis, between a first position and a second position. A variable drive unit mounted to the platform may also be provided and include an input member movable, relative to a housing of the drive unit, between a first position and a second position. A control lever is attached to the chassis and operatively connected to the drive unit, the control lever configured to vary a position of the input member relative to the housing. The control lever is movable incrementally between a first position corresponding to the first position of the input member, and a second position corresponding to the second position of the input member. The vehicle also includes a control linkage system having a pivot link associated with the chassis and configured to pivot, relative to the chassis, about a main pivot axis. The linkage system further includes: a control link having a first end connected to the pivot link, and a second end connected to the control lever; and a drive link with a first end pivotally connected to the pivot link at a first drive link pivot, and a second end pivotally connected to the input member at a second drive link pivot. The linkage system is configured to maintain, as the platform is moved between its first and second positions, both a position of the input member relative to the drive unit, and a position of the control link relative to the chassis.

In another embodiment, a vehicle is provided including: a chassis supported by one or more drive wheels; a platform suspended from the chassis; and a platform lift mechanism configured to raise and lower the platform, relative to the chassis, between a first position and a second position. The vehicle also includes a variable drive unit attached to the platform and having an input arm that is pivotable, relative to a housing of the drive unit about an input pivot axis, between a first position and a second position. A prime mover is attached to either the platform or the chassis and operatively coupled to the drive unit to provide power to the same. A control lever is attached to the chassis and operatively connected to the drive unit, the control lever configured to vary a position of the input arm relative to the housing of the drive unit. The control lever is movable incrementally between a first position corresponding to the first position of the input arm, and a second position corresponding to the second position of the input arm. The vehicle also includes a drive motion control linkage system. The linkage system includes a bellcrank supported for pivoting relative to the chassis about a main pivot axis, wherein the bellcrank has a first arm and a second arm. The linkage system also includes a control link having a first end connected to the first arm at a control link pivot, and a second end connected to the control lever. An included drive link has a first end pivotally connected to the second arm of the bellcrank at a first drive link pivot for pivoting about a first drive link pivot axis, and a second end pivotally connected to the input arm at a second drive link pivot for pivoting about a second drive link pivot axis.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 3A-3B (collectively referred to as FIG. 3) illustrate portions of an exemplary platform lift mechanism, wherein: FIG. 3A is a partial side elevation view of the platform lift mechanism; and FIG. 3B is a perspective view of a portion of the mechanism of FIG. 3A;

FIGS. 11A-11B are rear perspective views of a vehicle (e.g., power mower) incorporating a control system, e.g., motion control linkage system, in accordance with another embodiment of the invention (with various vehicle structure removed for clarity), wherein: FIG. 11A illustrates the control area as well as the linkage system; and FIG. 11B is an enlarged view of the linkage system of FIG. 11A;

Figure 1:
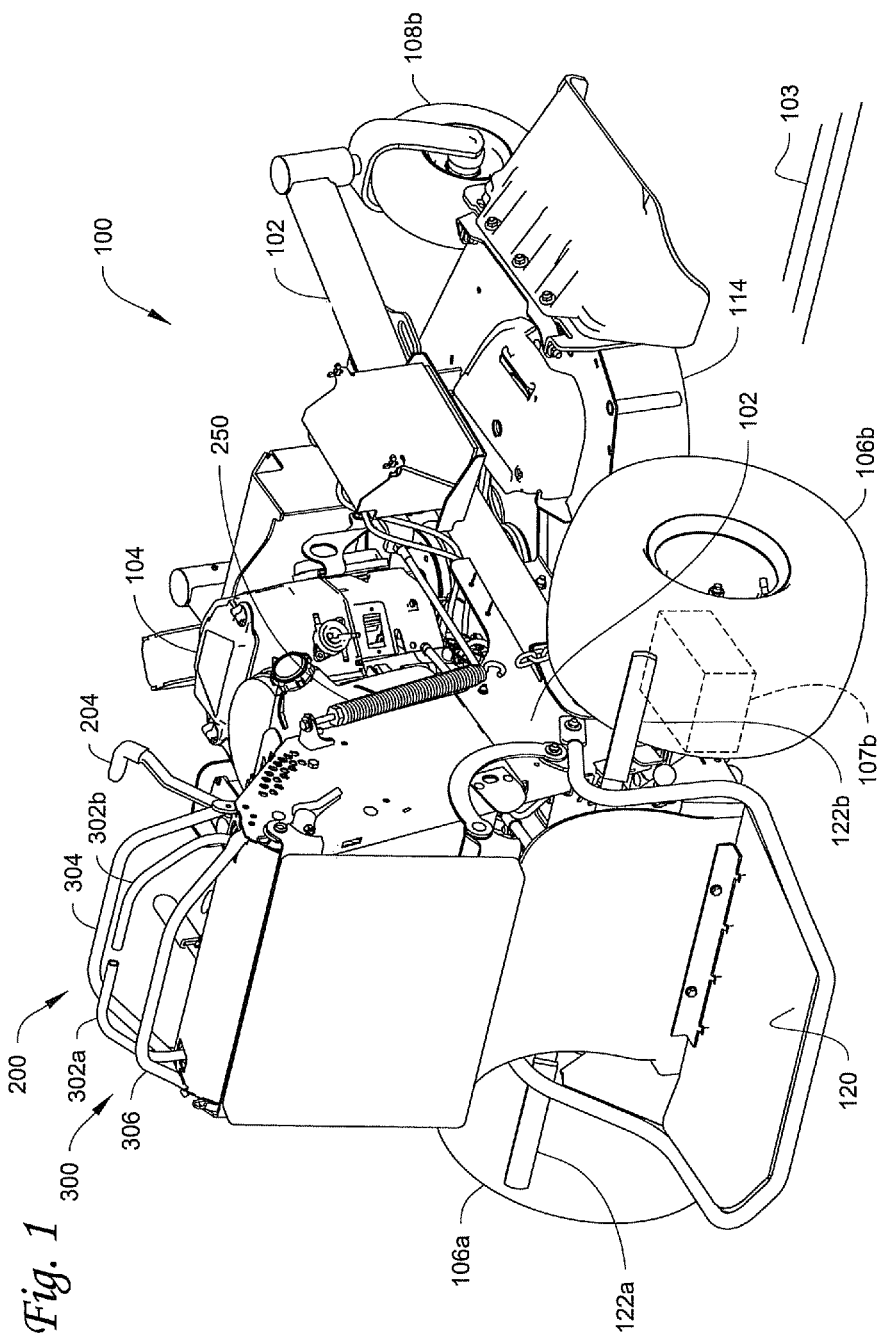
FIG. 1 is a rear perspective view of an exemplary vehicle, e.g., power walk-behind/stand-on mower, incorporating a control system, e.g., motion control linkage system, and a platform lift mechanism, in accordance with embodiments of the present invention, the mower illustrated with a standing platform in a deployed position.

The figures are rendered primarily for clarity and, as a result, are not necessarily drawn to scale. Moreover, certain structure (e.g., various chassis portions/components, fasteners, bearings, cables, and hydraulic components (including but not limited to: conduits; hoses; and fittings, etc.)) may be removed from some or all of the views to better illustrate aspects of the depicted embodiments, or where inclusion of such structure/components is not necessary to an understanding of the various embodiments of the invention. The removal of such structure/components, however, is not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the instant invention.

Embodiments of the present invention are generally directed to vehicles such as lawn mowers and the like, and to motion control systems for use with the same. Embodiments of the present invention may include a linkage-based motion control system for accurately adjusting a parameter (e.g., velocity) of the vehicle even as a geometric relationship between an input (e.g., velocity control lever) and an output (e.g., drive train) of the vehicle is modified. As a result, the vehicle may respond to a given operator input in a repeatable manner regardless of the vehicle's geometric configuration.

While the exemplary motion control linkage systems are described and illustrated herein as velocity control systems, alternative embodiments may address systems for controlling most any parameter wherein a location of a control input may be varied relative to the associated controlled device.

Other embodiments may further include an adjustable stop bar for use with adjusting a terminal position of a control lever (e.g., a velocity control lever). Accordingly, the maximum potential speed of the vehicle may be adjusted without altering a throttle setting of the vehicle.

FIG. 1 illustrates an exemplary self-propelled vehicle, e.g., a walk-behind or ride-on lawn mowing vehicle 100 that may incorporate a motion control linkage system 300 (see FIG. 4) in accordance with one embodiment of the present invention. While, for the sake of brevity, embodiments of the invention are herein described with respect to a walk-behind/stand-on lawn mower (hereinafter generically referred to merely as a "mower"), those of skill in the art will realize that the invention is equally applicable to other types of walk-behind, ride-behind (e.g., such as those utilizing sulkies), and conventional ride-on mowers, as well as to most any other walk-behind, ride-behind, or ride-on self-propelled utility vehicle (e.g., aerator, snow blower, blower/vacuum, spreader, etc.).

While the general construction of the mower 100 is not necessarily central to an understanding of the invention (e.g., other mower configurations may be utilized without departing from the scope of the invention), one configuration is now briefly described. The mower 100 may also be, in some respects, similar to the mowers described in U.S. patent application Ser No. 12/275,381, the content of which is incorporated herein by reference in its entirety.

Figure 2:
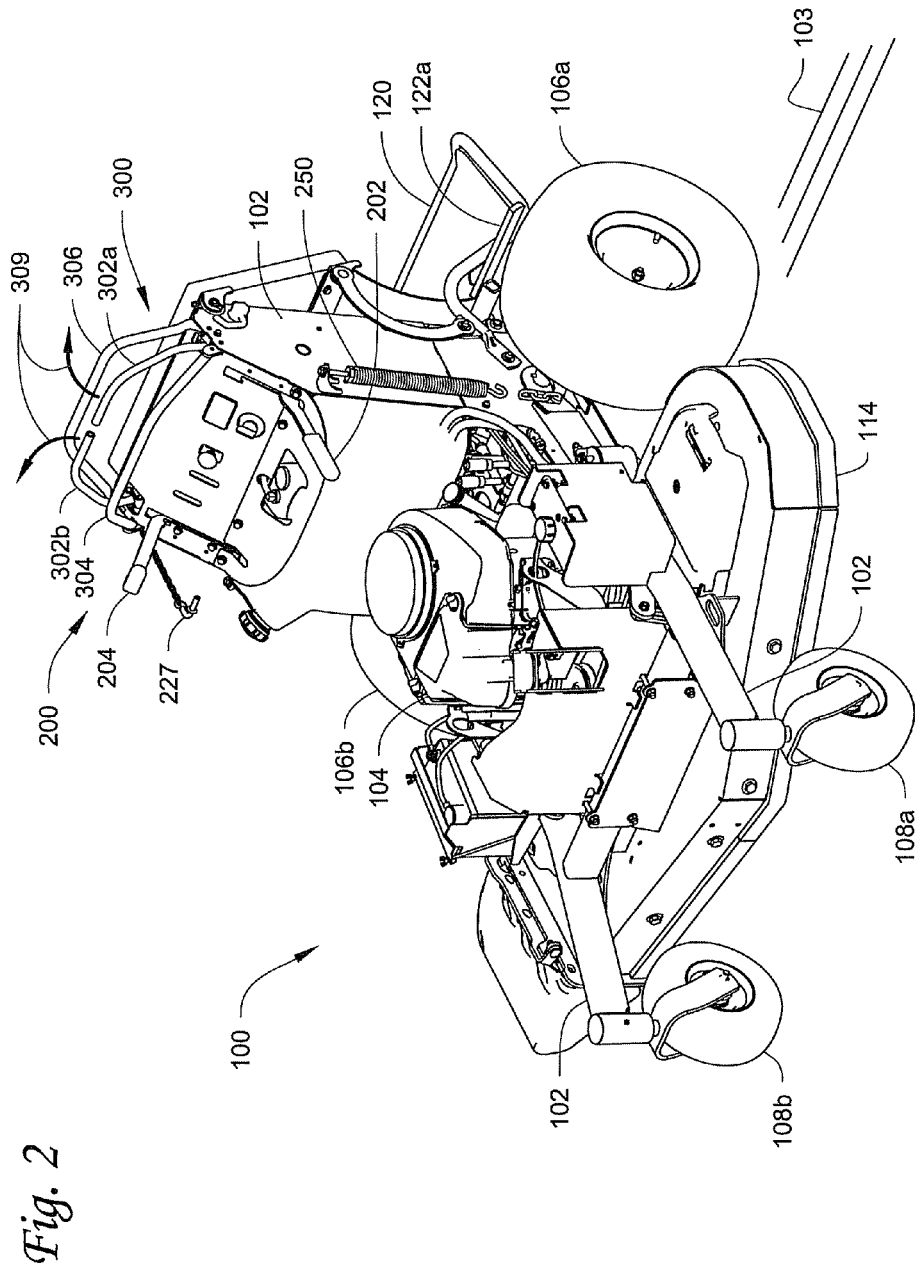
FIG. 2 is a front perspective view of the mower of FIG. 1 illustrating an operator control area.

FIGS. 1 and 2 illustrate the exemplary mower 100 having a chassis 102 and a power source or prime mover, e.g., internal combustion engine 104. A pair of transversely opposing, ground engaging drive members, e.g., first and second drive wheels 106, may be coupled for rotation to opposing sides of the chassis to support and propel the mower 100 relative to a ground surface 103. Each drive wheel 106 may be powered by its own hydraulic wheel motor 107 (only right side motor 107*b* shown in FIG. 1) attached to the chassis 102 that receives power from, at least in one embodiment, its own variable drive unit, e.g., hydraulic drive unit such as a hydraulic pump 110 (see FIGS. 4 and 6), that is itself powered by the engine 104. While described herein as a hydraulic drive unit, other embodiments may utilize other variable drive units, e.g., electrical or mechanical systems, without departing from the scope of the invention.

The pumps 110 and the engine 104 may be mounted or attached to a platform 112 (see FIG. 4) that, as described in more detail below, is suspended from, and movable relative to, the chassis 102 via a platform displacement, e.g., lift, mechanism. Alternatively, one or both of the pumps and engine could be attached to the chassis. The engine 104 may include an output shaft having a sheave (not shown) that provides power to an input sheave 118 on each pump 110 via an endless belt 117 as represented in broken lines in FIG. 7. In the illustrated embodiment, the platform 112 may be raised and lowered between a first and a second position by the platform lift mechanism.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon the generally horizontal ground surface 103 as shown in FIGS. 1 and 2. These terms are used herein to simplify the description, however, and not to limit the scope of the invention in any way.

Moreover, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Operator controls, some of which are described below, may permit independent control of the speed and direction of each drive wheel 106 (e.g., each pump 110), allowing control of mower 100 speed and direction from either a walking or riding (e.g., standing) position generally behind the mower 100. A pair of front swiveling caster wheels 108 (only right wheel visible in FIG. 1), which may be connected to forwardly extending chassis rails, may support the front of the mower 100 in rolling engagement with the ground surface 103.

Although the illustrated mower has the drive wheels 106 in the rear and caster wheels 108 in front, this configuration is not limiting. For example, other embodiments may reverse the location of the wheels, e.g., drive wheels in front and driven or passive wheels in back. Moreover, other configurations may use different wheel configurations altogether, e.g., a tri-wheel configuration. Moreover, while the mower 100 is illustrated as incorporating a hydraulic drive system, other drive systems, e.g., gear or pulley driven systems, may also be utilized without departing from the scope of the invention.

A lawn mower cutting deck 114 may be mounted to a lower side of the platform 112 generally longitudinally between the drive wheels 106 and the caster wheels 108. The cutting deck 114 may include one or more cutting blades 115 (see, e.g., FIG. 4) as is known in the art. The cutting blades may be operatively powered, via spindles passing through the deck, by a belt 116 (see also FIG. 4) driven by the engine 104. During operation, power is selectively delivered to the cutting deck 114, whereby the blades 115 rotate at a speed sufficient to sever grass and other vegetation passing beneath the cutting deck.

The exemplary mower 100 may also include a standing platform 120 that may be moved between a deployed position as shown in FIGS. 1 and 2, and a stowed position (not shown). In the deployed position, an operator may stand upon the standing platform 120 during vehicle operation. Alternatively, the standing platform 120 may be moved to the stowed position to accommodate the operator in a walk-behind configuration.

As shown in FIG. 2, the mower 100 may further include an operator control area 200. In the illustrated embodiment, the control area 200 may include various operator controls that are mounted to upwardly extending portions of the chassis 102 near the rearward end of the mower such that the controls are located within comfortable reach of the operator standing either behind the mower or upon the platform 120.

The control area 200 may include any number of controls necessary or beneficial to the operation of the mower 100. For instance, a parking brake handle 202 (see FIG. 2) may selectively activate a brake (e.g., brake members 122 shown in FIGS. 1 and 2) when the mower is parked. Other controls, including for example, a throttle lever to control the speed of the engine 104, engine choke, hour meter, and PTO deck engagement control (to initiate and terminate power delivery to the cutting blades of the mower deck 114) may also be provided. Still further, one or more control levers, e.g., drive control levers 302*a* and 302*b*, may be provided. The drive control levers 302 may be attached, e.g., pivotally attached, to the chassis 102 and be configured to control the speed and direction of the drive wheels 106*a* and 106*b*, respectively, (e.g., via their associated pumps 110*a* and 110*b*) as described in more detail below.

Figure 3A:
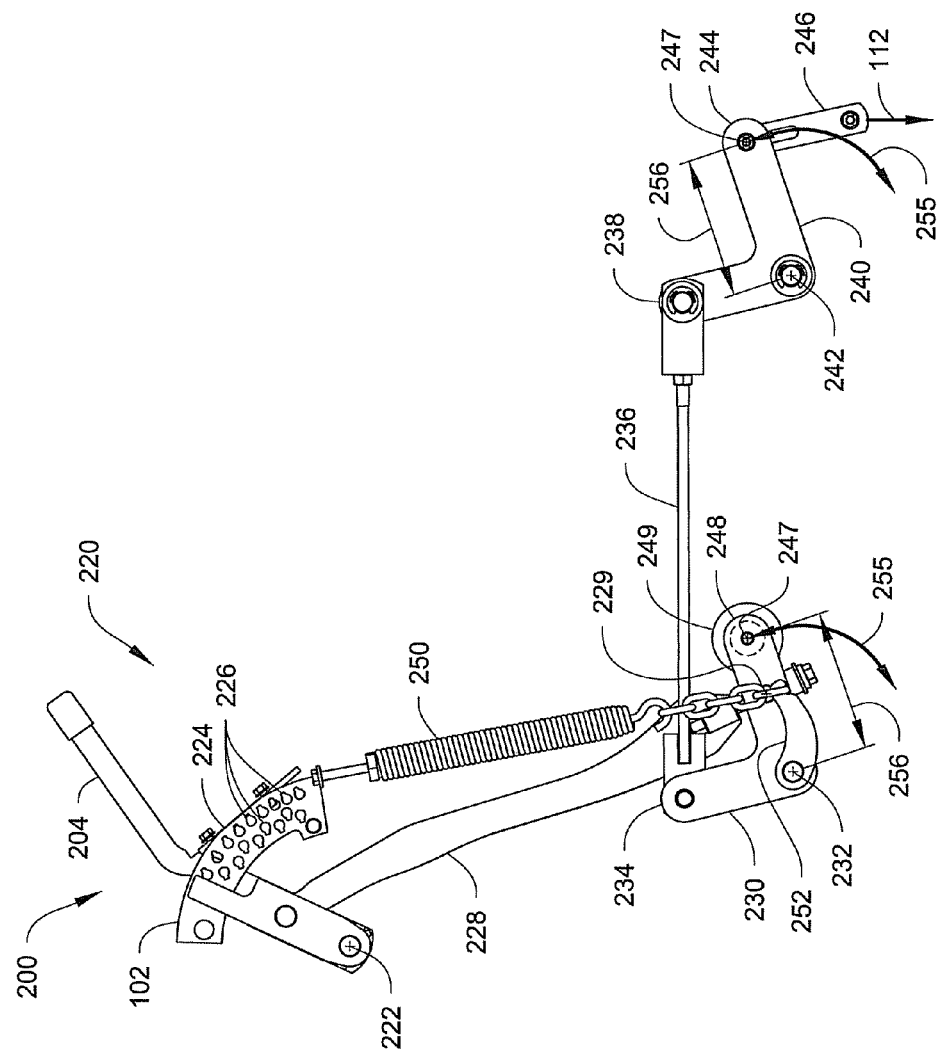

As shown in FIG. 3A, a platform displacement or lift mechanism 220 may also be provided to permit the operator to move (e.g., raise and lower) the platform 112, and thus the cutting deck 114, relative to the chassis 102 between at least a first and second position. In the illustrated embodiment, the mechanism may be manipulated by an adjustment lever 204 that is itself pivotally attached to the chassis 102 at a pivot 222 near the control area 200. In the illustrated embodiment, the mower may further include a pin, e.g., tethered pin 227 (see FIG. 2) operable to engage one of many openings 226 formed in a plate 224 of the frame. To reposition the lever 204 (and thus the platform 112), the lever may be manually lifted upwardly to expose the opening 226 corresponding to the desired platform height. Once the platform is located at or slightly above the desired height, the pin 227 may be inserted into the appropriate opening 226. By then releasing the lever 204, the weight of the platform 112 may then rest against the pin to maintain the platform at the desired height. While illustrated herein as incorporating a manual platform lift mechanism, other embodiments may substitute a powered, e.g., hydraulic or electric lift mechanism, without departing from the scope of the invention.

As used herein, the term "pivot" refers to most any structure or feature that permits one component to pivot or rotate relative to another. The pivots described and illustrated herein may be configured in most any manner that permits such relative motion. For instance, an axle, bolt, or shaft, optionally surrounded by a bushing or bearing, may be used to form the pivot. As various pivot configurations are well known in the art, further detail regarding these components as they relate to embodiments of the present invention are not provided herein. Moreover, for illustration purposes, a pivot may be identified in the figures by pointing either to the general structure defining the pivot, or to a pivot axis defined by the pivot. Further, any measurements identified herein that are indexed relative to a pivot are understood to be measured from/to the pivot axis of the respective pivot and in a direction orthogonal to the pivot axis.

As shown in the embodiment of FIGS. 3A and 3B, the lever 204 may be pivotally attached, at a distance offset from the pivot 222, to a connecting rod 228. At a lower end, the connecting rod 228 may be pivotally connected, via a pivot 229 (see also FIG. 3B), to a rear platform link or bellcrank 230. The rear bellcrank is, in turn, itself pivotally attached to the chassis 102 at a platform chassis pivot 232 defining a platform chassis pivot axis 243. A first end 234 of the rear platform bellcrank 230 may be pivotally attached to a tie rod 236 extending forwardly where it attaches to a first end 238 of a similar front platform link or bellcrank 240. The front platform bellcrank 240 may also, like the bellcrank 230, be pivotally attached to the chassis 102 at a platform chassis pivot 242 also defining a platform chassis pivot axis. A second end 244 of the front platform bellcrank 240 and a second end 248 of the rear platform bellcrank 230 may be pivotally attached to the platform 112 at a platform attachment point, e.g., platform pivot 247 defining a platform pivot axis 245. In the illustrated embodiment, the front platform/deck bellcrank 240 may utilize an intermediate bracket 246 as shown in FIG. 3A.

The front platform bellcrank 240 may be of the same size and geometry as the rear platform bellcrank 230 and, as a result of the tie rod 236, may be oriented similarly. Accordingly, movement of the lever 204 downwardly (e.g., in the clockwise direction in FIG. 3A) may result in pivotal movement of the front and rear platform bellcranks 230, 240 about the pivots 232 and 242, respectively, in the clockwise direction, effectively lowering the platform 112 and the deck 114. Conversely, raising the lever 204, e.g., pivoting it in a counterclockwise direction about the pivot 222, results in raising the platform 112 and deck 114.

As illustrated in FIG. 3B, the second end 248 of the rear platform bellcrank 230 may support (e.g., be welded or otherwise integral with or fixed to) a shaft 251 that extends transversely across the mower 100. The shaft 251 may extend from the rear platform bellcrank 230 through a transversely spaced link 249 and through one or more brackets 254 (e.g., one on each side of the platform) that support the platform 112. The brackets 254 may hang on the shaft 251, thereby providing an effective pivoting relationship (between the platform 112 and the bellcrank 230) about the centerline of the shaft. The link 249 may, at a first end, be welded to the shaft 251, and at its opposite end, connect to a shaft that defines the pivot 229. On the opposite side of the mower 100, the shaft 251 may connect to a similar or identical mechanism (e.g., to another front and rear platform bellcrank 230, 240, link 249, and another tie rod 236 (see FIGS. 3A and 3B)) on the opposite side of the mower).

As a result of the described geometry, the platform 112 and deck 114 may be attached and lifted relative to the chassis 102 at four separate lift points. Moreover, the respective front and rear platform bellcranks 230, 240 and tie rods 236 may form a 4-bar linkage on each side of the mower 100 that keeps the platform 112 generally level at any selected elevation (even though described as "level," the platform may be configured such that it is slightly but equally inclined (e.g., inclined forwardly) at all elevation settings).

To assist the operator with raising and lowering the platform 112/deck 114, springs 250 may optionally be provided on one or both sides of the mower 100. An upper end of each spring may attach to the chassis 102 (see FIG. 1), while a lower end of each spring may operatively connect to the lever arms(s) 230, e.g., it may connect to a chain that is attached to an auxiliary lever arm 252. The lever arm 252 may be rigidly attached to (e.g., via a connecting tube), but transversely offset from, the lever arm 230 as shown in FIG. 3B so that it pivots in unison with the rear bellcrank.

Using the exemplary platform lift mechanism 220 described and illustrated herein, the platform 112 may move along a path defined by an arc 255 (see FIG. 3A) as the platform is raised and lowered. This arc may be defined by a linear distance 256 between the axis of the platform chassis pivot 232 (or 242) and the axis of the platform attachment point/pivot 247 of the respective platform bellcrank 230 (or 240). In the illustrated embodiment, the distance 256 is identical for all (e.g., both front and rear) platform bellcranks.

Figure 6:
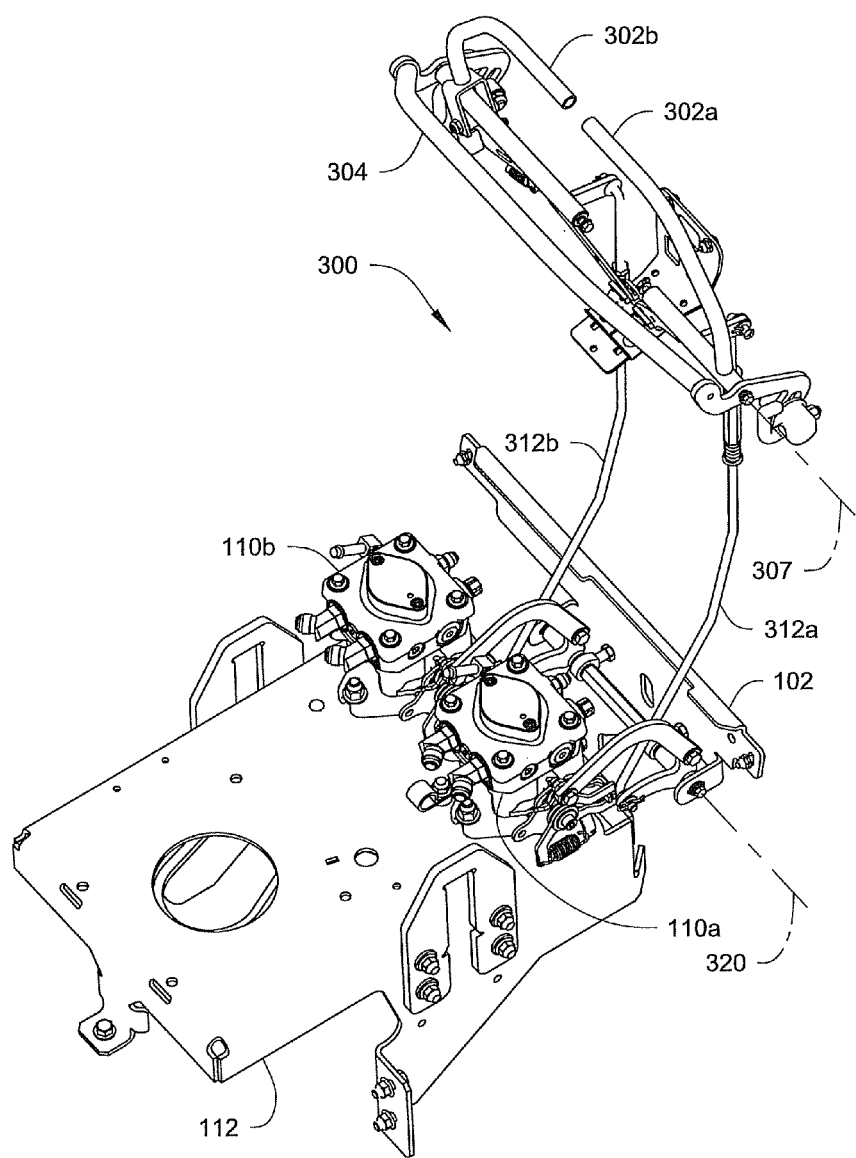
FIG. 6 is a partial perspective view of the mower of FIGS. 1 and 2 illustrating the motion control linkage system.
Figure 7:
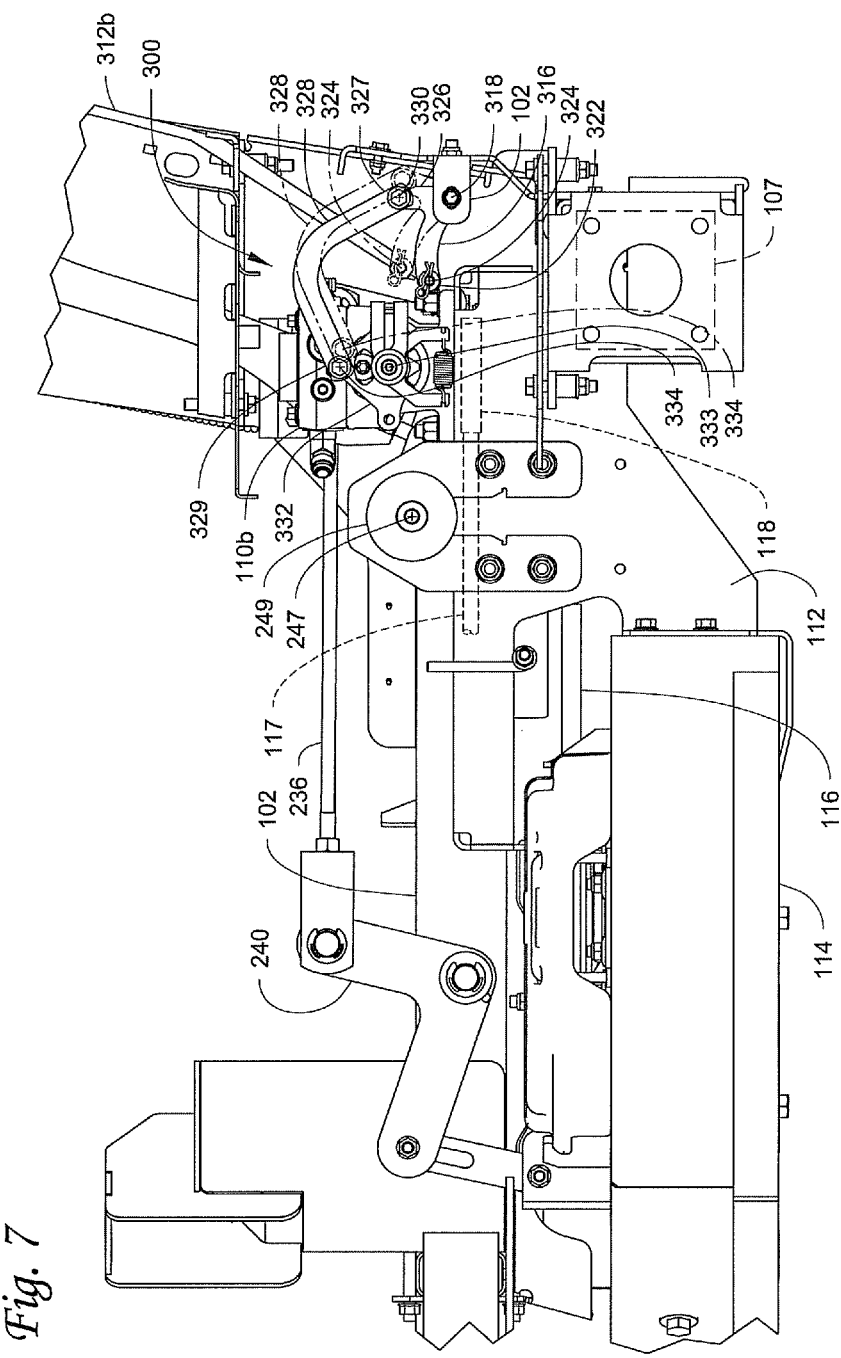
FIG. 7 is a partial enlarged side elevation view of the mower of FIGS. 1 and 2 illustrating the platform in a first or fully raised position, and the motion control linkage system in both a first or neutral position (solid lines) and a second or maximum forward position (broken lines)
Figure 8:
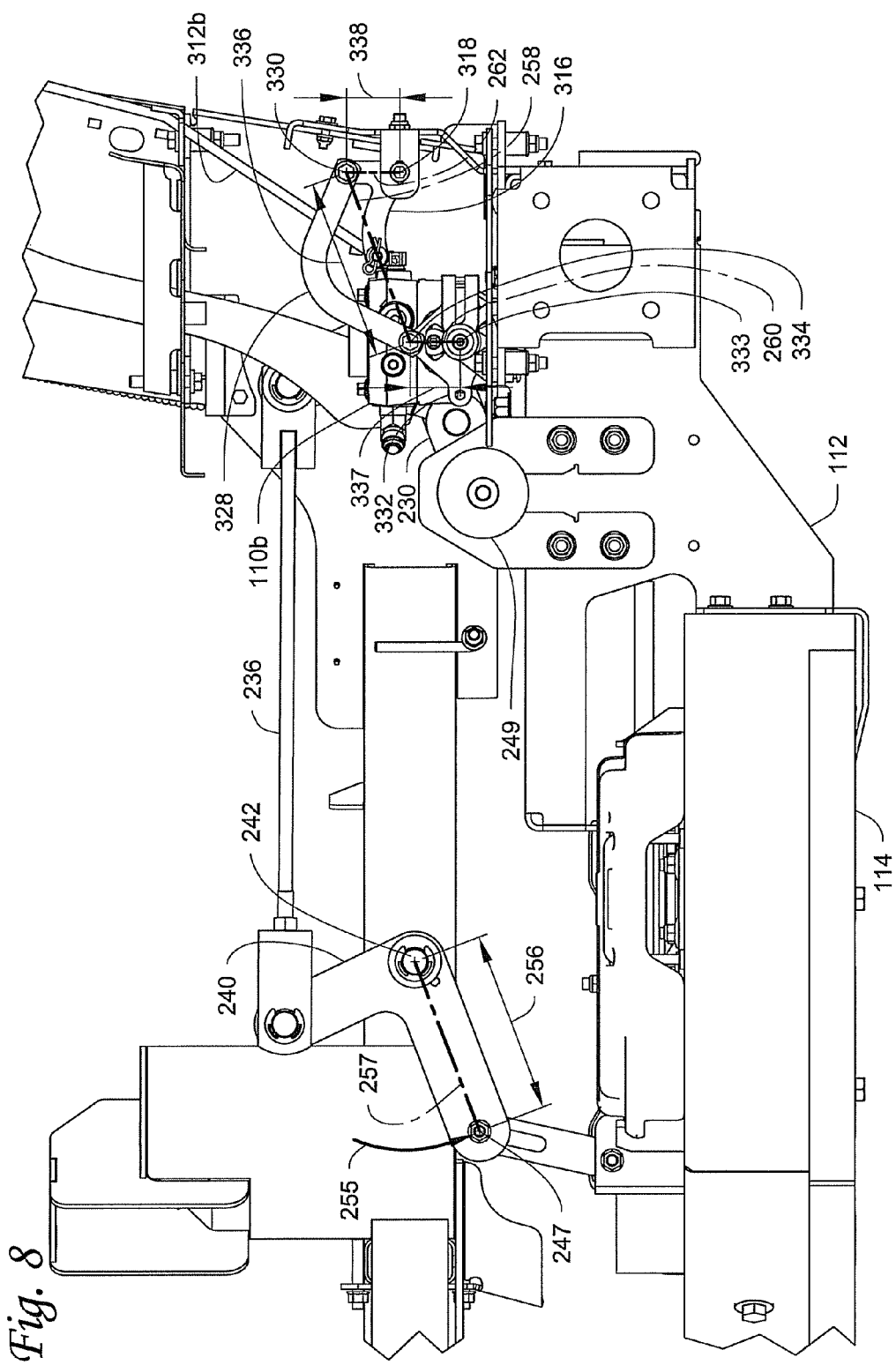
FIG. 8 is a partial enlarged side elevation view similar to FIG. 7 but with the platform shown in a second or fully lowered position, and the motion control linkage system shown in the first or neutral position.

As described elsewhere herein, the engine 104, cutting deck 114, and hydraulic pumps 110 (see FIGS. 4 and 6) may all be attached to the platform 112 and thus move up and down as the platform lift system 220 is manipulated (see also FIGS. 7 and 8). This may, as stated elsewhere herein, provide for relatively planar belt 116 routing between these components, reducing belt wear and potential belt roll-off that may occur in systems having greater fleeting angles. However, as the hydraulic pumps 110 move relative to the chassis 102 and thus to the control levers, a conventional linkage may cause unintended movement of input arms 332 of the pumps 110 (see, e.g., FIG. 7) merely as a result of platform repositioning.

Motion control linkage systems in accordance with embodiments of the present invention may, however, avoid these problems, i.e., they may provide consistent and repeatable input to the hydraulic pumps 110, for a given position of the respective drive control levers 302, regardless of platform location. As a result, consistent mower response may be provided.

Figure 4:
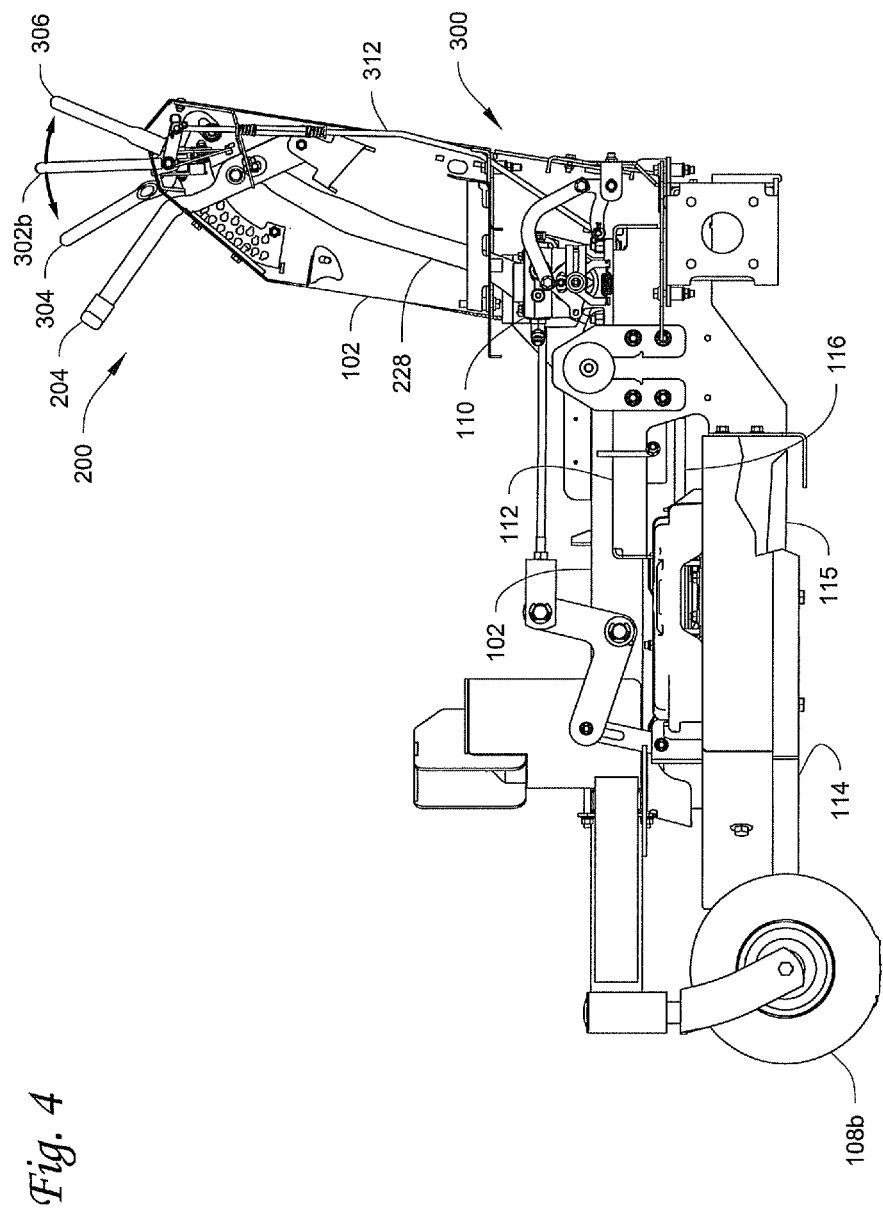
FIG. 4 is a side elevation view of the mower of FIGS. 1 and 2 with some structure removed to illustrate the platform lift mechanism, the motion control linkage system, and the control area.

As shown in FIGS. 1, 2, and 4, the exemplary motion control linkage system 300 may include a first or left drive control lever 302a and a second or right drive control lever 302b pivotally attached to the chassis 102. The control levers 302 may be configured to pivot about a transverse horizontal axis 307 (see FIG. 6) from a first or neutral position towards both a first or forward stop bar 304, and a second or rearward stop bar 306. One or both of the control levers 302 (e.g., 302b as shown in FIG. 2) could be biased for pivotal outward movement (e.g., in a direction 309 about an axis generally parallel to a longitudinal axis of the mower 100). Such a configuration may permit, upon pivotal inward movement of the control lever 302b by the operator to the position shown in FIGS. 1 and 2, activation of an operator presence switch (not shown). As is recognized in the art, activation of the switch may be requisite to activation of some of the mower subsystems.

The control levers 302 may also be biased to the intermediate, neutral position between the two stop bars 304 and 306 for mower operation as shown in FIGS. 1, 2 and 4. Each control lever 302 may be movable between at least the first or neutral position (shown in FIG. 4), which corresponds to a first or zero forward velocity of its respective drive wheel 106/pump 110 (e.g., input arm 332), and a second or engaged position (abutting the forward stop bar 304), which corresponds to a second or maximum forward velocity of its respective drive wheel/pump (e.g., input arm 332). Stated another way, each control lever 302 may independently vary a velocity of its respective drive wheel 106 incrementally between a first or zero forward velocity and a second or predetermined maximum forward velocity without varying the engine throttle. Each lever 302 may additionally be movable to a third position (abutting the rear stop bar 306) corresponding to a third or predetermined maximum reverse velocity of its respective drive wheel. In the illustrated embodiment, the neutral position of the control levers 302 may be located more closely to the rearward stop bar 306 to provide a greater range of movement for forward travel.

Figure 5:
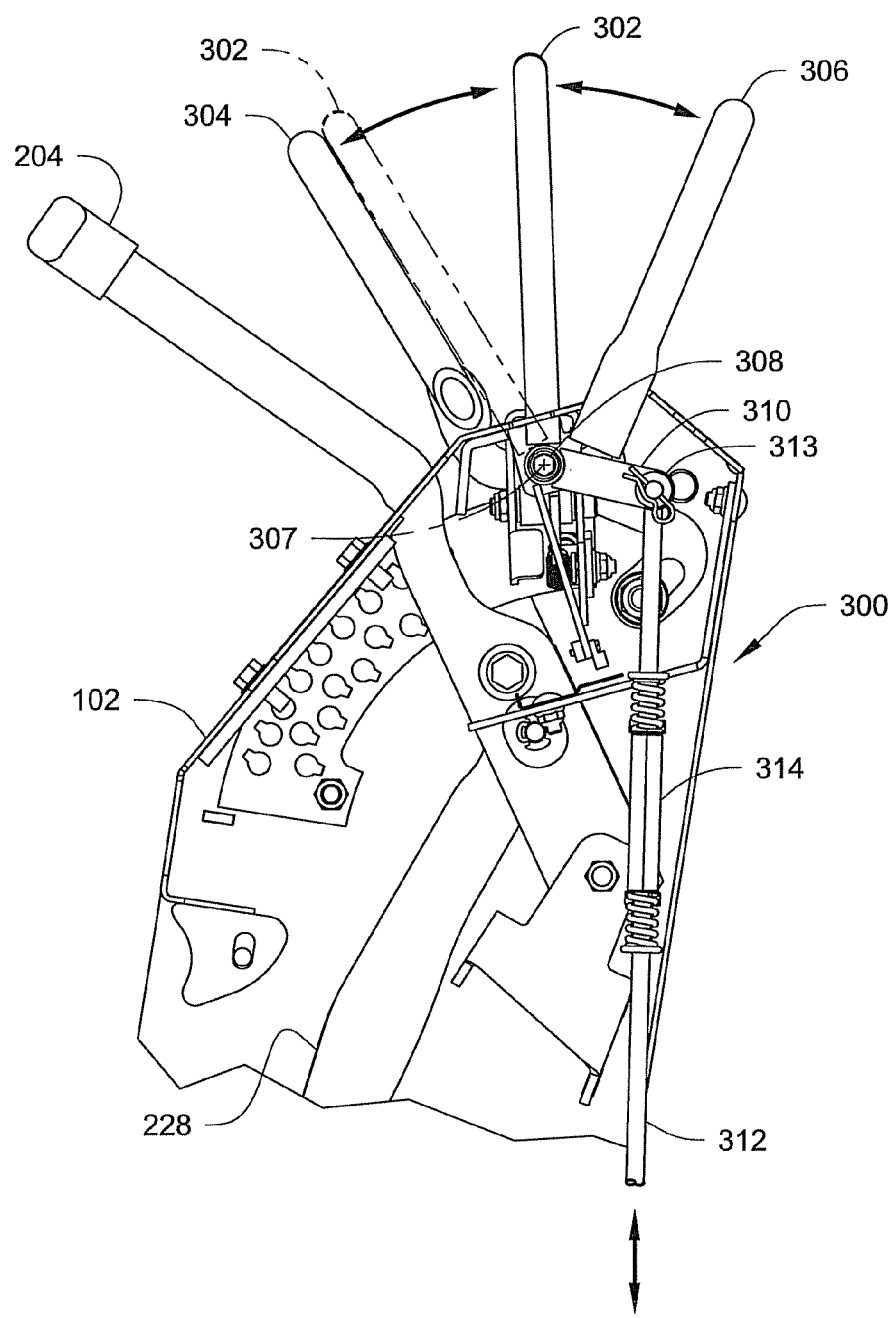
FIG. 5 is an enlarged view of the control area of FIG. 4.

FIG. 5 illustrates an enlarged partial view of the control area of FIG. 4. As illustrated in this view, each control lever 302 may pivot relative to the chassis 102 at the transverse horizontal axis 307 (see also FIG. 6) defined by a pivot 308. Each control lever 302 may also include a secondary lever arm 310 (which is offset from the pivot 308) that pivotally receives an upper end of a control link 312 at a pivot 313. The control link 312 may be segmented and include an adjustment mechanism 314 to lengthen or shorten the control link after installation. As one can appreciate from FIG. 5, movement of the control lever 302 towards the forward stop bar 304 (or towards the rear stop 306) results in movement of the control link upwardly (or downwardly) as indicated by the arrows in this view.

FIG. 6 illustrates a perspective view of the motion control linkage system 300. The platform 112 and the pumps 110 are also illustrated in this view. However, various other structures, e.g., engine 104 and most of the chassis 102, are removed for visibility. As this view illustrates, the control system 300 may include independent linkage systems for each side of the mower 100, e.g., for each control lever 302 and its associated pump 110. While the system 300 is illustrated in the figures as including dual mechanisms to independently control the drive wheel 106 on each side of the mower 100, control systems for alternate applications may utilize a single linkage without departing from the scope of the invention.

FIG. 7 is an enlarged view of a portion of the mower of FIG. 4. This view illustrates a lower portion of one side of the control linkage system 300 that operatively connects one control link 312 (e.g., link 312b) to its respective pump 110 (e.g., pump 110b). As shown in this view, a pivot link, e.g., bellcrank 316, may be pivotally attached to the chassis 102, or otherwise operatively attached such that it pivots relative to the chassis, at a main or chassis pivot 318 for pivoting about a horizontal transverse, main pivot axis 320 (see FIG. 6). Each bellcrank 316 may include a first arm defining a first end 322 that is offset from the main pivot 318. The first arm of the bellcrank may be pivotally connected to a proximal end of the control link 312 at a control link pivot 324 defining a control link pivot axis. The bellcrank 316 may also include a second arm defining a second end 326 pivotally connected to a first end 327 of a drive link 328 at a first drive link pivot 330 defining a first drive link pivot axis. A second end 329 of the drive link 328 may pivotally connect to a distal end of the pump input member or arm 332 at a second drive link pivot 334 defining a second drive link pivot axis. The input arm 332 may move, e.g., pivot, about an input pivot 333 defining an input pivot axis, relative to a housing of the pump, thereby repositioning an internal swashplate within the pump to alter the flow of hydraulic fluid delivered to the respective wheel motor 107 (see also FIG. 1). In the illustrated embodiment, the drive link may be curvilinear in shape to better accommodate the mower configuration. However, other shapes, e.g., straight, are certainly possible without departing from the scope of the invention.

The solid line representation of the drive link 328 and bellcrank 316 in FIG. 7 represents the geometry of the system 300 when the drive control lever 302 is in the first or neutral position (see solid line representation of the control lever 302 in FIG. 5). Conversely, the broken line representation of the drive link 328 and bellcrank 316 in FIG. 7 represents the geometry of the system 300 when the drive control lever 302 is in the second or engaged position (see broken line representation of the control lever 302 in FIG. 5). Thus, movement of the control levers 302 may vary a position of the respective pump input arm 332 relative to the pump housing. For instance, as is evident in FIG. 7, incremental movement of the drive control lever 302 from the first or neutral position to the second or engaged position causes the pump input arm 332 (to which the drive link 328 is attached) to pivot, relative to the pump housing, from a first or pump neutral position (wherein the pump input arm is approximately vertical, e.g., about 12 o'clock in FIG. 7), to an adjustable second or maximum position (wherein the pump input arm is rotated slightly clockwise in FIG. 7, e.g., to about one o'clock as shown in broken lines). This relationship between control levers 302 and their respective input arms 332 exists regardless of whether the platform is in (or is moving between) the first position, the second position or any intermediate position.

FIG. 8 is a view similar to FIG. 7, but with the platform 112 shown at its second or lowest position (as opposed to the first or highest position shown in FIG. 7) and the drive control lever 302/system 300 shown in the neutral position. The platform height adjustment may be accommodated as described elsewhere herein, e.g., with the lift mechanism 220 illustrated in FIGS. 3A-3B. Once again, as the platform 112 and deck 114 move from the elevation of FIG. 7 to the elevation of FIG. 8, movement occurs along the arc 255 defined by the distance 256 of each of the bellcranks 230 and 240 (see also FIG. 3A). Moreover, as the platform/cutting deck move, each drive link 328 may pivot about the first drive link pivot 330 from the position shown in solid lines in FIG. 7 to the position shown in FIG. 8.

In the embodiment illustrated in FIGS. 7 and 8, the drive link 328 has an effective length 336 (e.g., linear distance measured between the axes of the first and second drive link pivots 330 and 334) that is equal to the effective length 256 of the platform bellcranks. Moreover, a line 257 (see FIG. 8) extending orthogonally between axes of each platform chassis pivot 232/242 and its associated platform pivot 247 may be parallel to a line 258 extending orthogonally between the respective axes of the first and second drive link pivots 330 and 334.

Furthermore, as illustrated in FIG. 8, a linear distance 337 between the axis of the input pivot 333 and the axis of the second drive link pivot 334 may be equal to a linear distance 338 between the axis 320 of the main pivot 318 and the axis of the first drive link pivot 330, while a line 260 extending between the axis of the input pivot 333 and the axis of the second drive link pivot 334 may be parallel to a line 262 extending between the axis of the main pivot 318 and the axis of the first drive link pivot 330.

As a result of this geometry, the drive link 328 may accommodate pivoting of the platform 112 without imparting any unintended displacement to the input arm 332 of the pump. Thus, the platform 112/cutting deck 114 may be moved to any available height without altering the position of the pump input arm 332. The linkage system may therefore maintain, as the platform 112 is moved between its first and second positions, both the position of the input member 332 relative to the drive unit 110, and a position of the control link 312 (as well as the control lever 302) relative to the chassis 102.

While the control system is shown only in the neutral position in FIG. 8, the same result may occur regardless of the position of the drive control lever 302. For instance, placement of the drive control lever 302 in the second (e.g., forward) or engaged position (broken lines in FIG. 5) with the platform 112 at its lowest setting as shown in FIG. 8 would result in positioning the pump input arm 332 in the same location as it is positioned when the platform is at its highest setting (see broken line rendering in FIG. 7). In fact, the platform 112 could even be repositioned during operation (while the control handles remain in a given position) without any effect on pump configuration/mower speed.

Figure 9:
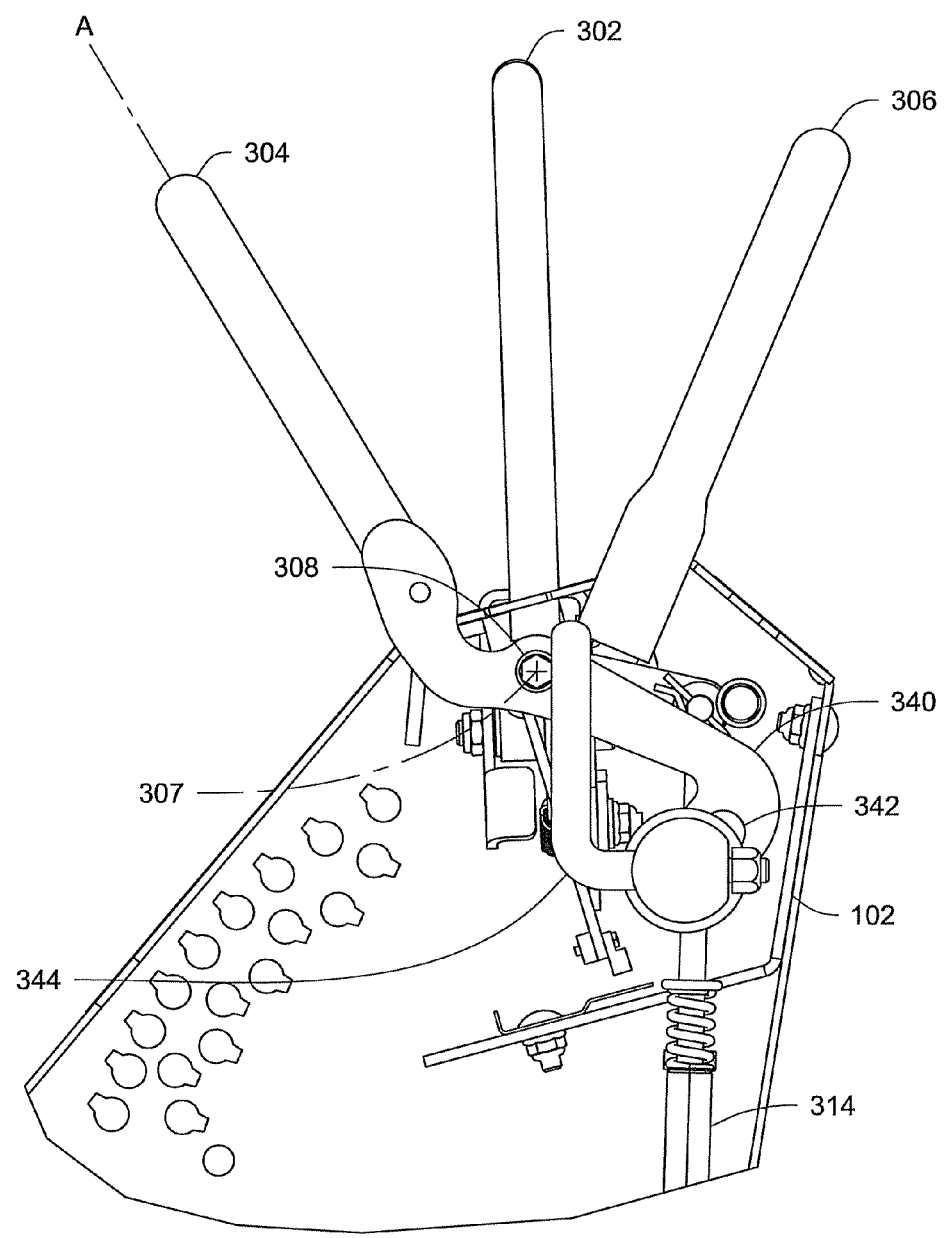
FIG. 9 is a partial side elevation view of the control area with a control lever shown in the first or neutral position and a control lever stop bar shown in a first position "A"

In some embodiments, the motion control linkage system 300 may further include a velocity limiting mechanism, an exemplary embodiment of which will now be described with reference to FIGS. 9 and 10. Generally speaking, the velocity limiting mechanism permits the operator to limit or adjust a maximum potential forward velocity of the mower (the speed resulting when the levers 302 are resting against the forward stop bar 304) without varying the engine throttle.

In the illustrated embodiment, the velocity limiting mechanism is configured as a selectively pivotable forward stop bar 304 defining a stop surface against which the drive control levers may rest when in the second or engaged position. When in a first or maximum potential velocity position "A", the forward stop bar 304 is positioned at a first distance from the drive control lever 302 (when the latter is in the neutral position) as shown in FIG. 9. In a second or reduced maximum potential velocity position "B", the forward stop bar 304 is positioned at a second distance from the drive control lever 302 that is less than the first distance as shown in FIG. 10.

Figure 10:
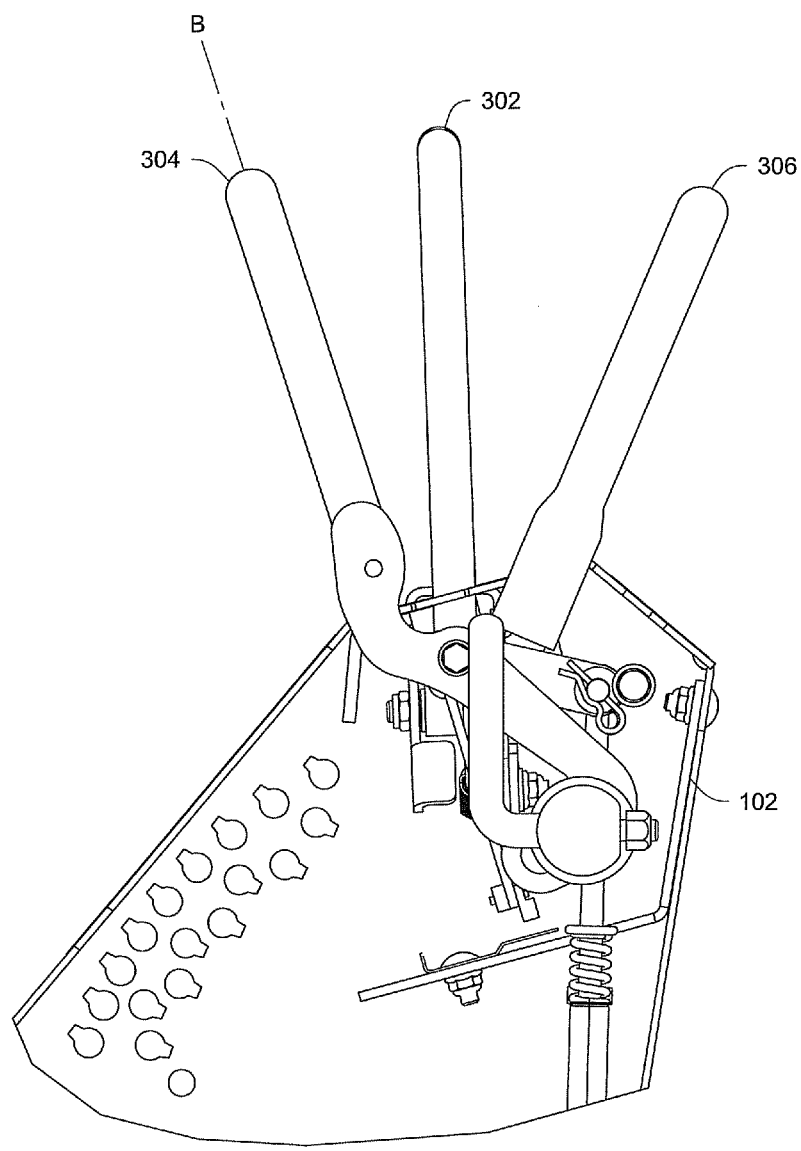
FIG. 10 is a partial side elevation view of the control area similar to FIG. 9 but with the control lever shown in the first or neutral position and the control lever stop bar shown in a second position "B;"

As a result, when the operator wants to reduce the potential maximum speed of the mower (e.g., to conduct operator training or to address cut quality under various mowing conditions) but still wishes to maintain optimal engine speed and/or the comfort associated with holding the drive control levers against the fixed stop bar 304, the forward stop bar can be repositioned as shown in FIG. 10 (or repositioned to any intermediate position). Repositioning the forward stop bar from position A of FIG. 9 to position B of FIG. 10 may, in one embodiment, reduce the maximum potential speed of the mower (for a given throttle setting) from a first maximum vehicle speed setting, e.g., about eight miles/hour, to a second or reduced maximum vehicle speed setting, e.g., about four miles/hour.

In one embodiment, the forward stop bar 304 is pivotally attached to the mower chassis 102 for pivoting about a transverse pivot axis that is coincident with the pivot axis 307 (see FIG. 6) of the drive control levers 302. As a result, the stop bar 304, independent of its position, stays within the same arc of rotation as that in which the levers 302 move. Accordingly, each drive control lever 302 contacts the stop bar 304 at the same location regardless of the stop bar position. By avoiding all but movement about a common axis for both the drive control levers 302 and the stop bar 304, comfortable and repeatable positioning of the drive control levers relative to the stop bar is maintained.

While not illustrated herein, the stop bar 304 could be split such that a separate stop bar is provided for each of the drive control levers 302. Moreover, the mower 100 could also include an adjustable rear stop bar (not shown) to adjust the maximum rearward velocity of the mower (e.g., the maximum rearward velocity resulting from pulling the drive control levers to a fully aft position).

The velocity limiting mechanism may also include a lock mechanism to secure the forward stop bar 304 in place. In one embodiment, the forward stop bar 304 includes a bracket 340 that sits along one or both sides of the chassis 102. The bracket may define a slot 342 through which a clamp 344 passes and threads to the chassis 102. By loosening the clamp 344, the forward stop bar 304 may pivot within the confines defined by the clamp sitting within the slot 342. By tightening the clamp 344, the stop bar may be locked in position A of FIG. 9, position B of FIG. 10, or any intermediate position. The slot 342 may include detents or the like to indicate discrete locations, or may permit generally infinite positioning.

FIGS. 11A-16 illustrate partial views of a vehicle, e.g., a power lawn mower 1000, in accordance with another embodiment of the invention. Except as identified below, the mower 1000 may be substantially identical to the mower 100 already described herein. For instance, it may utilize a hydraulic drive system having two hydraulic pumps 110 and two wheel motors 107 that are substantially identical to the like components already described herein. Moreover, the mower 1000 may include the chassis 102, the platform 112, and the control area 200 as already described herein, as well as a platform displacement mechanism 1220 (see FIGS. 13 and 15) configured to move the platform between first and second positions in a manner similar in most respects to the mechanism 220 described herein and illustrated in FIGS. 3A-3B.

As these common features/subsystems have already been described and illustrated with respect to the vehicle 100, further description/illustration of such aspects as they apply to the vehicle 1000 may not be addressed in detail herein. However, it is understood that these and other portions of the vehicle 100 (e.g., the cutting deck 114, motor 104, control area 200, hydraulic subsystems, etc.) may also form part of the vehicle 1000 even though not explicitly illustrated in FIGS. 11A-16.

As further described below, the vehicle 1000 may differ from the vehicle 100 in that it may substitute, in place of the motion control linkage system 300, a motion control linkage system 400 as described below. Stated alternatively, the exemplary motion control linkage system 400 illustrated as part of the vehicle 1000 described and illustrated herein below may replace the motion control linkage system 300 on the vehicle 100 of FIGS. 1-10, and vice versa, without departing from the scope of the invention.

Figure 11A:
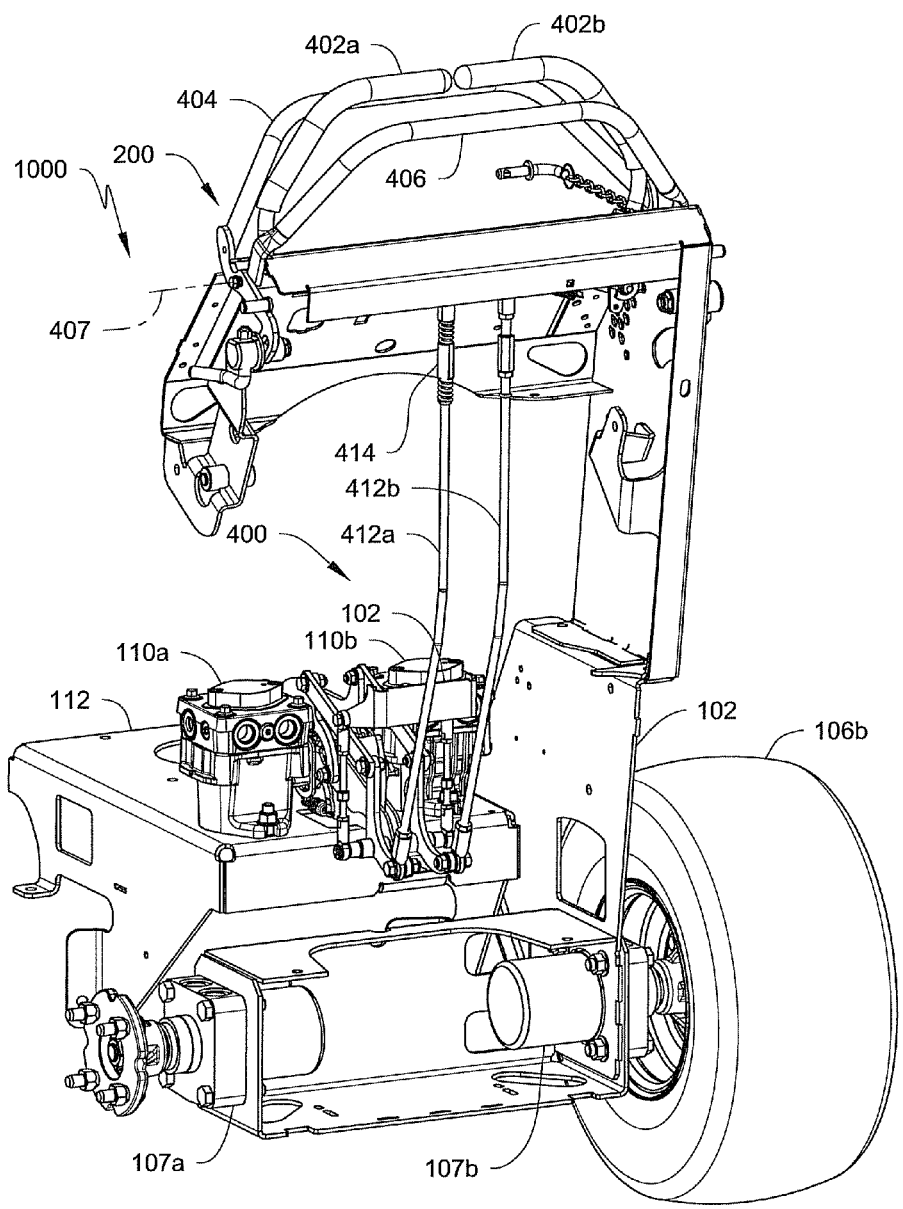
Figure 11B:
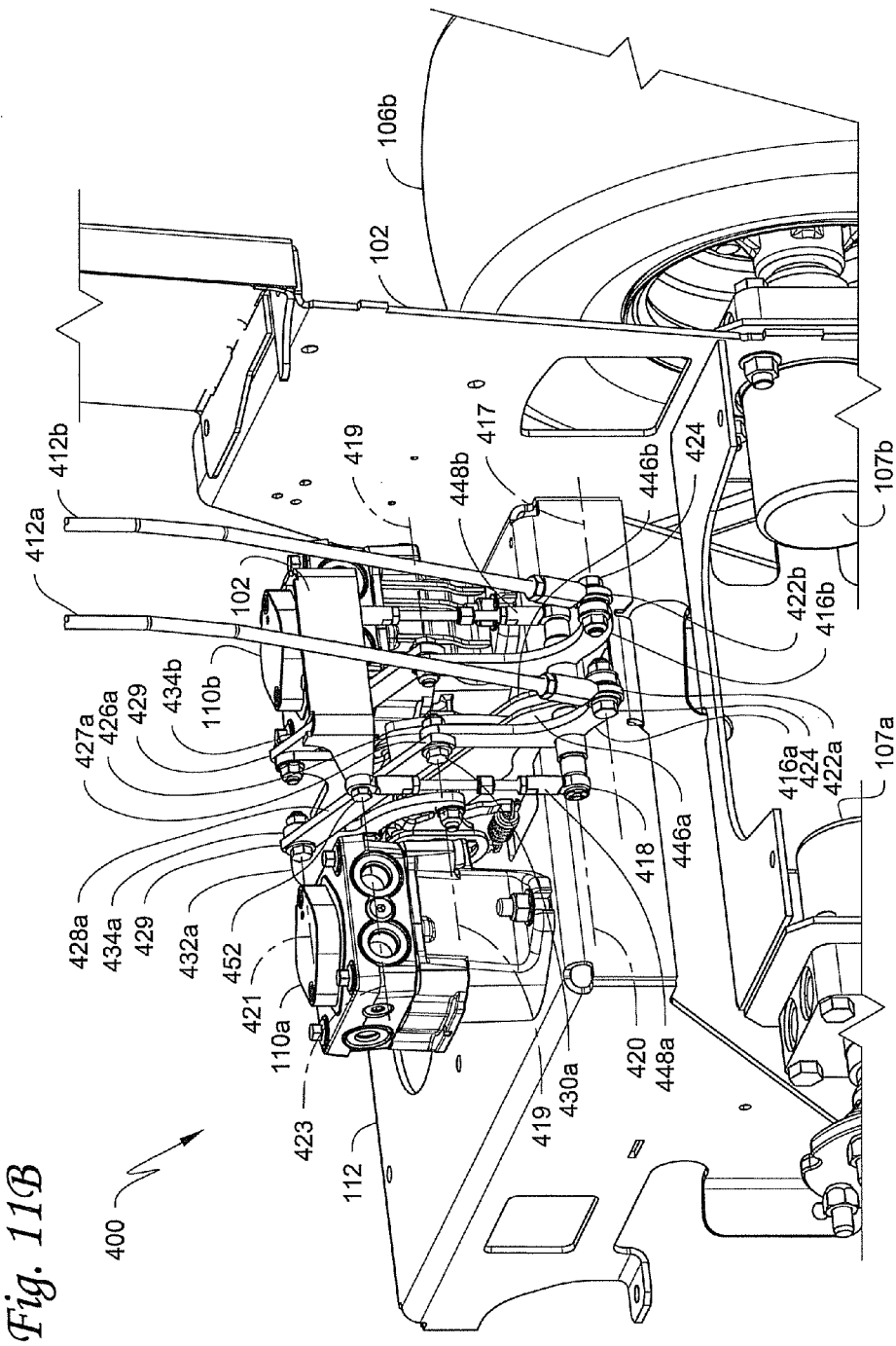

FIGS. 11A-11B illustrates perspective rear views of the mower 1000 with some structure removed to better illustrate portions of the motion control linkage system 400. FIG. 11A provides a more inclusive view illustrating upwardly extending control links 412 (similar to the links 312 described herein) connecting drive control levers 402 of the control area 200 with the rest of the control system, while FIG. 11B is an enlarged view of a lower portion of FIG. 11A.

As shown in FIG. 11A, the motion control linkage system 400 may (like the system 300) include a first or left drive control lever 402a and a second or right drive control lever 402b pivotally attached to the chassis 102. The control levers 402 may, like the levers 302 already described herein, be configured to pivot about a transverse horizontal axis 407 from a first or neutral position towards both a first or forward stop bar 404, and a second or rearward stop bar 406.

Like the control levers 302, the control levers 402 may be biased to an intermediate, neutral position located generally between the two stop bars 404 and 406 as already described herein. That is, each control lever 402 may be movable between at least the first or neutral position (shown in FIG. 11A), which corresponds to a first or zero forward velocity of its respective drive wheel 106/pump 110, and a second or engaged position (abutting the forward stop bar 404), which corresponds to a second or maximum forward velocity of its respective drive wheel/pump. As a result, each control lever 402 may independently vary a velocity of its respective drive wheel 106 incrementally between a first or zero forward velocity and a second or predetermined maximum forward velocity without varying the engine throttle. Accordingly, the control levers 402 (and stop bars 404 and 406) are substantially identical, and behave in a substantially identical way, to the control levers 302 (and stop bars 304 and 306) already described herein.

As with the system 300, each control lever 402 may also include a secondary lever arm that pivotally receives an upper end of one of the control links 412. Each control link 412 may be segmented and include an adjustment mechanism 414 to lengthen or shorten the control link during or after installation. As a result of this construction, movement of either control lever 402 towards the forward stop bar 404 (or towards the rear stop bar 406) results in movement of the respective control link upwardly (or downwardly).

FIG. 11B is a partial enlarged rear perspective view of a lower portion of the motion control linkage system 400. The platform 112 and the variable drive units, e.g., pumps 110, are also visible in this view. However, various other structures (e.g., engine 104, left wheel/motor, platform lift mechanism 1220, and portions of the chassis 102) are removed to better illustrate the system 400. As this view illustrates, the control linkage system 400 may include independent linkages for each side of the mower 1000, e.g., a linkage for each control lever 402a and 402b and its respective pump 110a and 110b. While the system 400 is illustrated in the figures as separate mechanisms to independently control a drive wheel 106 on each side of the mower 1000, control systems for alternate applications may utilize a single linkage without departing from the scope of the invention.

As further illustrated in FIG. 11B, a lower portion of one side of the control linkage system 400 may operatively connect one control link 412 (e.g., link 412b) to its respective pump 110 (e.g., pump 110b). This connection is achieved in the illustrated embodiment with the use of a pivot link or bellcrank 416 associated with the chassis 102, which may be supported such that it is pivotable relative to the chassis, about a main pivot 418 defining a horizontally transverse main pivot axis 420. Unless otherwise stated herein, the other pivots described herein may also pivot about axes that are parallel to the main pivot axis 420.

As further shown in FIG. 11B, each bellcrank 416 may include a first arm defining a first end 422 that is offset from the main pivot 418. The first end 422 of each bellcrank 416 may be pivotally connected to a proximal end of its respective control link 412 at a control link pivot 424 for pivoting about an axis 417. Each bellcrank 416 may also include a second arm defining a second end 426 offset from the main pivot 418 and pivotally connected to a first end 427 of a drive link 428 at a first drive link pivot 430 defining a first drive link pivot axis 419. A second end 429 of each drive link 428 may pivotally connect to a distal end of a pump input member or arm 432 at a second drive link pivot 434 defining a second drive link pivot axis 421 (see also FIG. 12). The input arm 432 may pivot about an input pivot (defining an input pivot axis 433; see FIG. 12) relative to a housing of the pump, thereby repositioning an internal swashplate within the pump to alter the flow of hydraulic fluid delivered to the respective wheel motor 107 (see also FIG. 11A).

Figure 12:
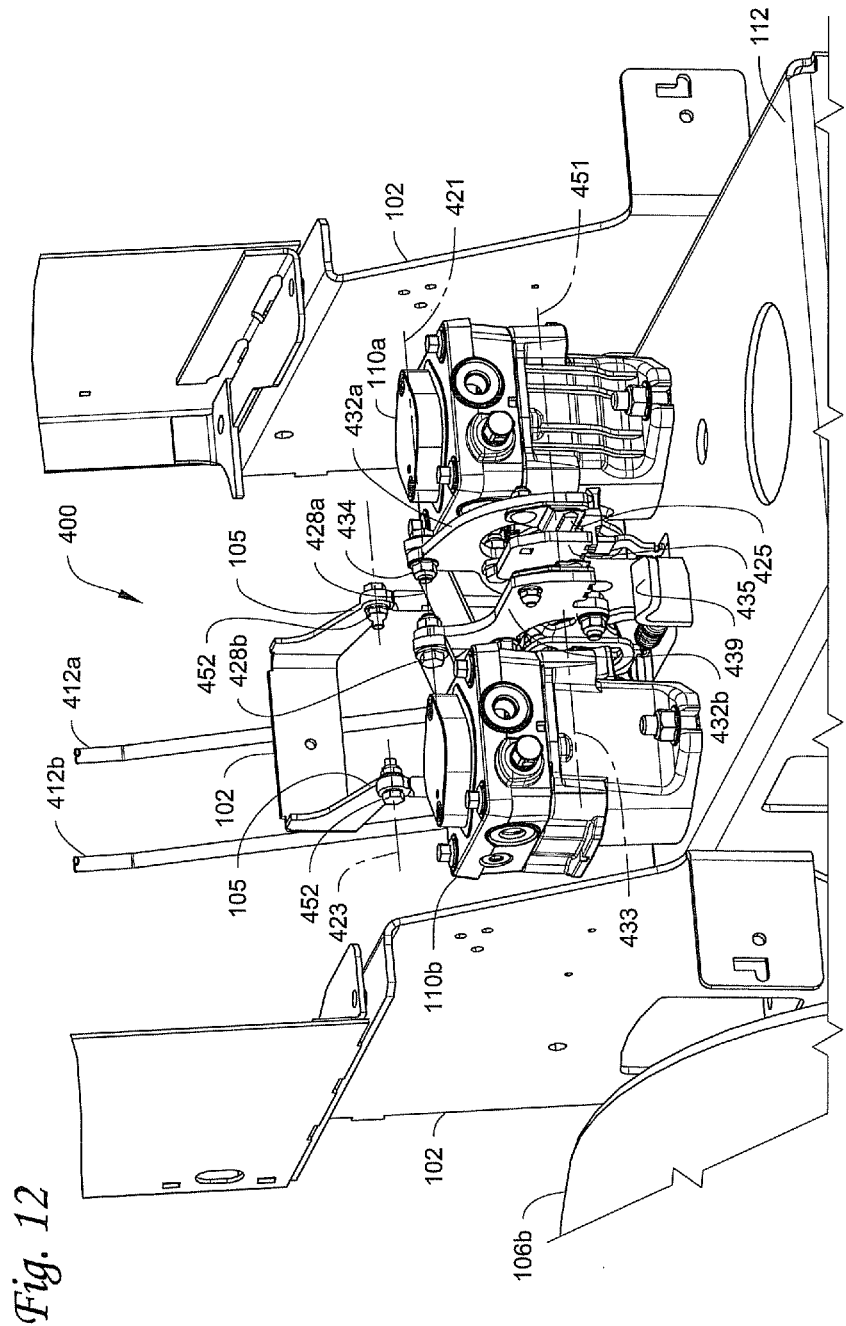
FIG. 12 is a front perspective view of the vehicle and linkage system of FIGS. 11A-11B.

FIG. 12 illustrates a front perspective view of a portion of the control linkage system 400. As shown in this view, the arms 432a and 432b may be of different shapes to, for example, accommodate movement of the arms relative to mower structure (not shown).

As FIG. 12 further illustrates, the platform 112 may include a tab 435 that, in the illustrated embodiment, protrudes upwardly between the two pumps 110. The tab 435 may incorporate a proximity sensor that cooperates with a proximity target 425 on one or both of the pump input arms 432 to provide an electrical signal corresponding to one or both of the arms being in a pump-neutral position. The platform 112 may further include one or more stops 439 to limit the pivotal movement of one or both input arms 432 during operation. In the illustrated embodiment, a stop 439 is provided for the right side pump 110b only. The linkage for the left side pump 110a may be adjusted to provide an output corresponding to that of the pump 110b when both control handles 402 are in the second or full forward position.

Figure 13:
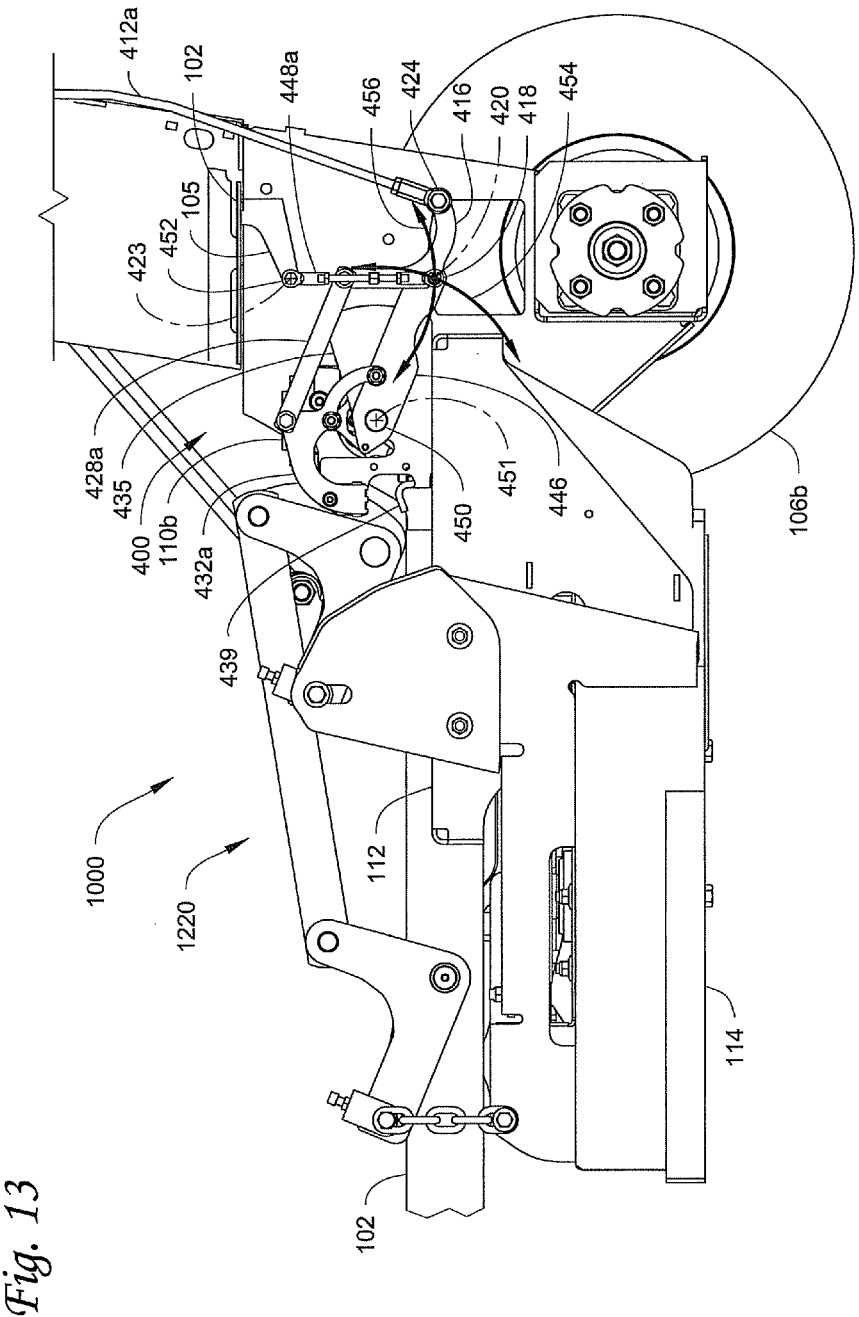
FIG. 13 is side elevation view of the vehicle and linkage system of FIGS. 11A-11B illustrating the platform in a first or fully raised position, and the linkage system in a first or neutral position.

As shown in FIGS. 11B and 13, each side of the control linkage system 400 may further utilize a first reference link 446 (e.g., 446a) and a second reference link 448 (e.g., 448a). These two links may, as described below, locate the bellcrank 416 in space and support it relative to the chassis 102. Stated alternatively, instead of physically attaching the main pivot 418 directly to a location on the chassis 102, the first and second reference links may be used to support and locate the main pivot in space, e.g., to ultimately fix the location of the main pivot 418 relative to the chassis 102. However, that ultimate location may be adjustable as further described below.

FIG. 13 illustrates a side elevation view of the system of FIGS. 11A-11B and 12 with the left pump 110a removed for clarity. The first reference link 446 may, as shown, be a single link, (e.g., a welded, unitary link having portions 446a and 446b; see FIG. 11B), or alternatively be two independent links. As indicated in this view, the first reference link 446 may include a first end that is pivotally connected to the pivot link (e.g., to the bellcrank 416) for pivoting about the main pivot axis 420 of the main pivot 418, and a second end pivotally connected to the platform 112 such that it is pivotable about a first reference pivot axis 451 (defined by a first reference pivot 450). In the illustrated embodiment, the first reference pivot axis is coincident with the input pivot axis 433 (see also FIG. 12). Similarly, each second reference link 448 may include a first end pivotally connected to the pivot link (e.g., to the bellcrank 416) for pivoting about the main pivot axis 420 of the main pivot 418, and a second end pivotally connected to the chassis 102 (e.g., at a location 105) such that it is pivotable about a second reference pivot axis 423 defined by a second reference pivot 452. While illustrated as utilizing two links 448a and 448b, embodiments utilizing only a single second reference link are also contemplated.

As a result of this configuration, the first end of the first reference link 446 may be capable of movement along a first arc 454 defined by the first reference pivot axis 451 of the first reference pivot 450, while the first end of the second reference link 448 may be capable of movement along a second arc 456 defined by the second reference pivot axis 423 of the second reference pivot 452. The intersection of the first ends of the first and second reference links (e.g., the intersection of the first and second arcs 454, 456) may define the location of the main pivot axis 420 of the main pivot 418.

At least the second reference link 448 may be configured as an adjustable-length tie rod. Accordingly, a radius of the second arc 456 may be altered, e.g., the point of intersection of the first arc 454 with the second arc 456 may be changed to provide adjustment to the location of the main pivot 418. As one can appreciate, however, once the length of the second reference link 448 is set (e.g., its jam nuts are appropriately tightened), the main pivot 418 may be generally fixed in space. In other embodiments, the second reference link may be non-adjustable, i.e., fixed in length.

With this general overview, the operation of the control linkage system 400 will now be described with reference primarily to FIGS. 13-16. These figures illustrate a side elevation view of the vehicle 1000 and system 400 under various vehicle operating scenarios. In each of these views, various mower structures, e.g., the left wheel and corresponding hydraulic motor (although the input arm 432a is still shown), engine 104, and the left hydraulic pump 110a, among other components, may be removed to better illustrate system operation.

Figure 14:
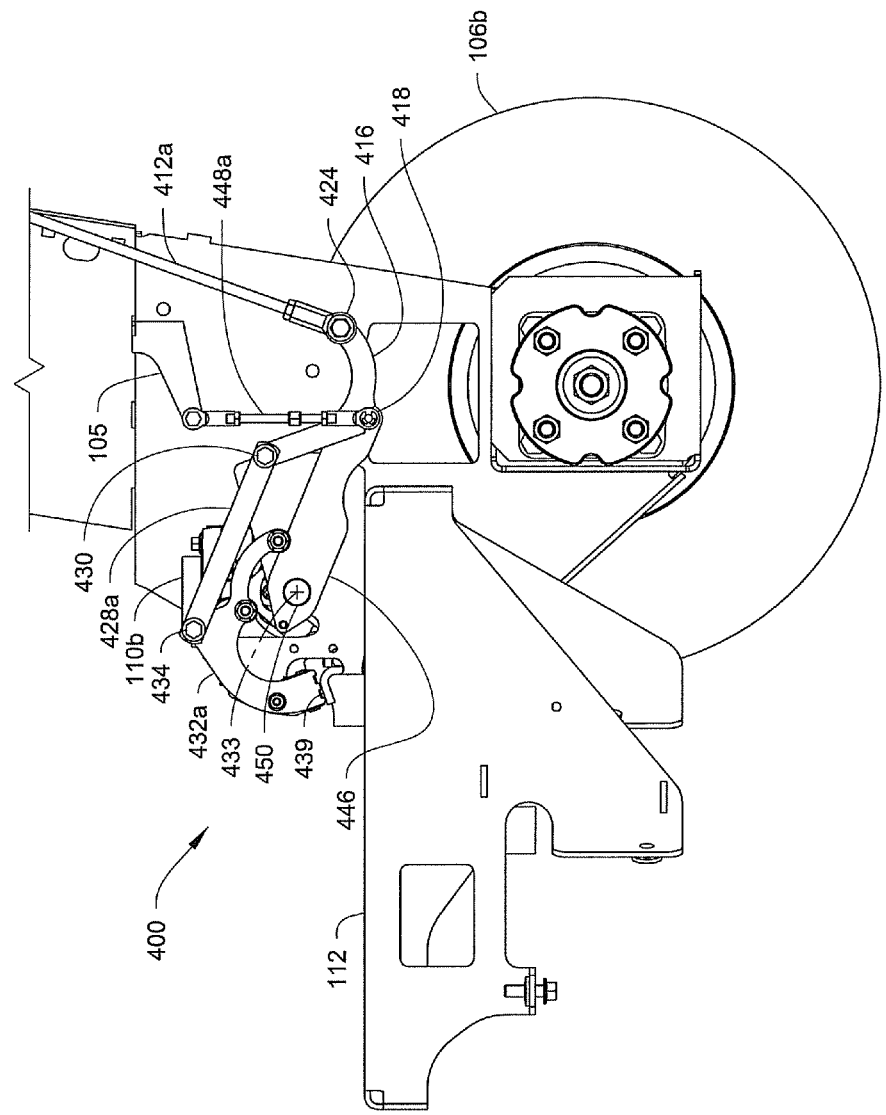
FIG. 14 is a partial side elevation view similar to that of FIG. 13, but illustrating the linkage system in a second or maximum forward position.

FIG. 13 represents the geometry of the system 400 when the drive control lever 402 is in the first or neutral position (see solid line representation of the control lever 302 in FIG. 5) and the platform 112 is in the first or fully raised position. Conversely, FIG. 14 represents the geometry of the system 400 when the drive control lever 402 is in the second or engaged position (see broken line representation of the control lever 302 in FIG. 5) while the platform remains in the fully raised position (while illustrated in FIG. 13 (as well as FIG. 15), the mechanism 1220 is removed from FIG. 14 (and from FIG. 16)). As is visible in FIGS. 13-14, movement of either control lever 402 may vary a position of the respective pump input arm 432 relative to the pump housing. Thus, as with the system 300, incremental movement of the drive control lever 402 from the first or neutral position to the second or fully engaged position causes the pump input arm 432 (to which the drive link 428 is attached) to pivot, relative to the pump housing, from a first or pump neutral position (wherein the pump input arm is approximately vertical, e.g., about 12 o'clock as shown in FIG. 13), to a second or maximum position (wherein the pump input arm is rotated slightly counterclockwise as shown in FIG. 14, e.g., to about eleven o'clock). As described below, this relationship between control levers 402 and their respective input arms 432 exists regardless of whether the platform is in (or is moving between) the first position, the second position or any intermediate position.

Figure 15:
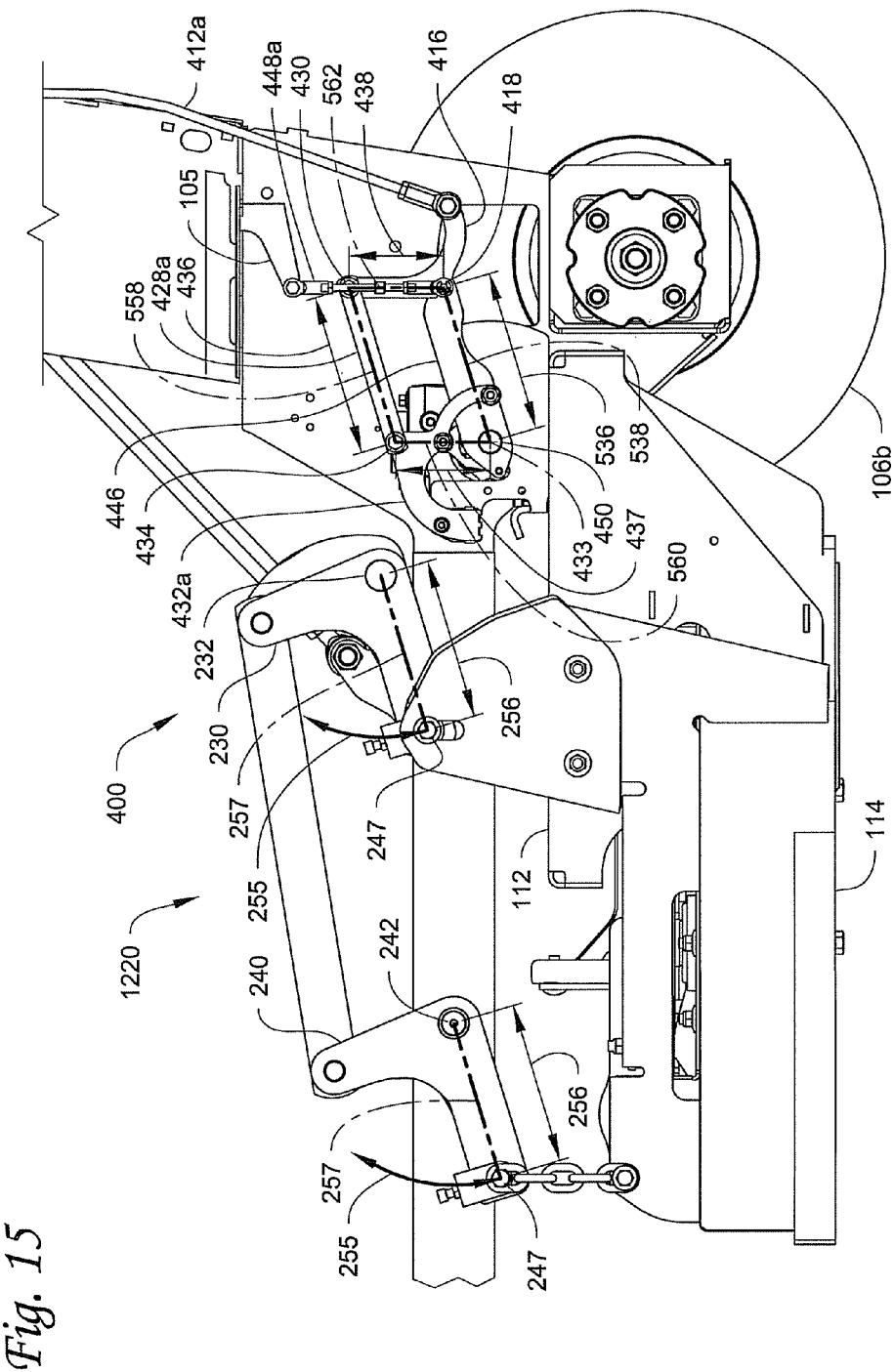
FIG. 15 is side elevation view of the vehicle and linkage system of FIGS. 11A-11B illustrating the platform in a second or fully lowered position, and the linkage system in a first or neutral position.
Figure 16:
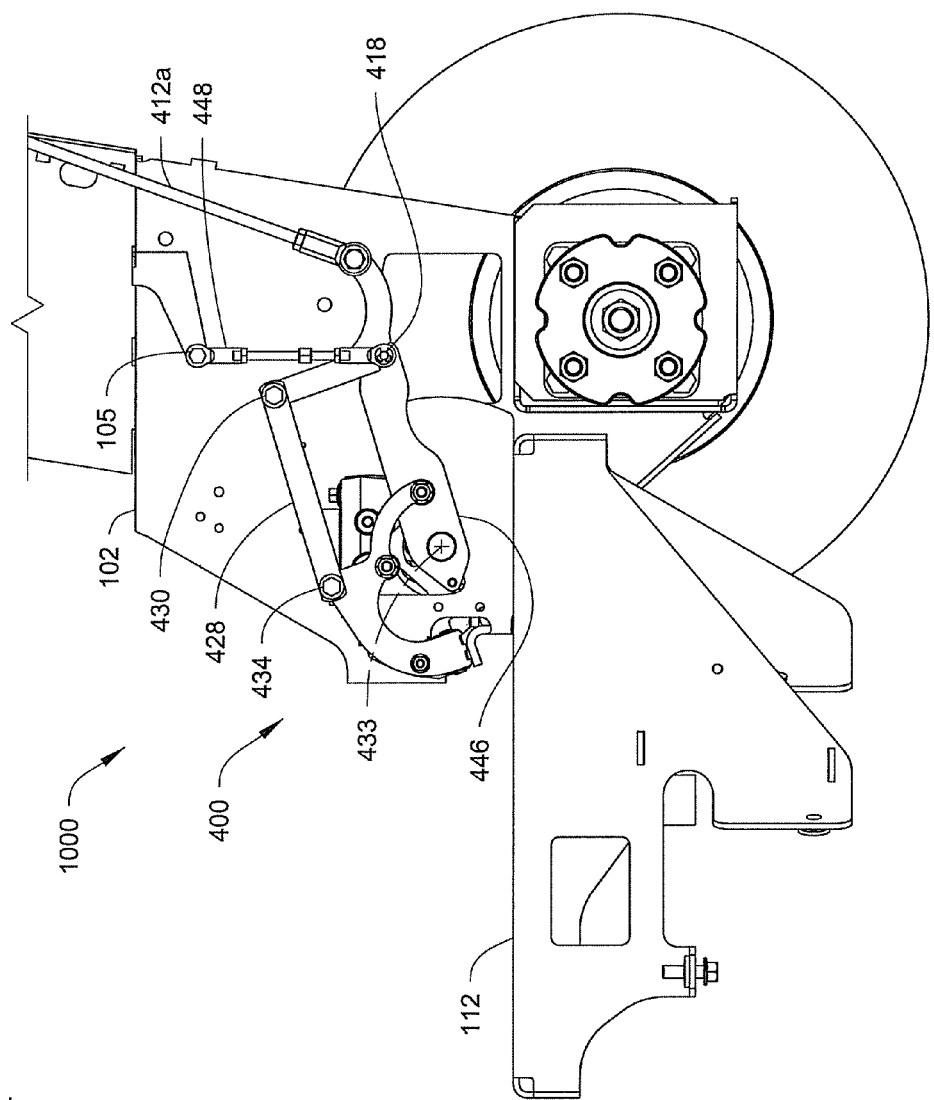
FIG. 16 is a partial side elevation view similar to that of FIG. 15, but illustrating the linkage system in the second or maximum forward position.

FIGS. 15 and 16 are views similar to FIGS. 13 and 14, respectively, but with the platform 112 shown at its second or fully lowered position (as opposed to the first or fully raised position shown of FIGS. 13-14). FIG. 15 illustrates the drive control lever 402/system 400 in the neutral position, while FIG. 16 illustrates the system when the control lever is in the full forward position. The platform height adjustment may be accommodated with the lift mechanism 1220 (see FIGS. 13 and 15) in a manner substantially identical to that already described herein with respect to the lift mechanism 220 illustrated in FIGS. 3A-3B. Once again, as the platform 112 and deck 114 move from the elevation of FIGS. 13-14 to the elevation of FIGS. 15-16, movement occurs along the arc 255 defined by the distance 256 of each of the bellcranks 230 and 240 (see also FIG. 3A). Moreover, as the platform/cutting deck move, each drive link 428 may pivot about the first drive link pivot 430 from the position shown in FIGS. 13 and 14 to the respective positions shown in FIGS. 15 and 16. Similarly, the first reference link 446 may pivot about the main pivot 418 from the position of FIGS. 13-14 to that of FIGS. 15-16.

With reference to, for example, FIG. 15, the system 400 may utilize a drive link 428 having an effective length 436 (e.g., linear distance measured between pivot axes of the first and second drive link pivots 430 and 434) that is equal to the effective length 256 of the platform bellcranks 230 and 240 (a length measured between the pivot axes of the pivot 232/242 and the pivot 247 of each bellcrank). Moreover, a line 257 extending orthogonally between the axis of the platform chassis pivot 232/242 and the axis of its associated platform pivot 247 may be parallel to a line 558 extending orthogonally between the pivot axes of the first and second drive link pivots 430 and 434 at all platform elevations.

Furthermore, the first reference link 446 may have an effective length 536 (e.g., linear distance measured between the axis 433/451 of the first reference pivot 450 and the main pivot axis 420) that is equal to the effective length 256 of the platform bellcranks and the effective length 436 of the drive link 428. Moreover, a line 538 extending orthogonally between the first reference pivot axis 451 of the first reference pivot 450 and the main pivot axis 420 of the main pivot 418 may be parallel to both the line 257 and the line 558 at all platform locations.

As further illustrated in FIG. 15, a linear distance 437 between the input pivot axis 433 and the second drive link pivot axis 421 (see also FIG. 11B) of the second drive link pivot 434 may be equal to a linear distance 438 between the main pivot axis 420 and the first drive link pivot axis 419 of the first drive link pivot 430, while a line 560 extending orthogonally between the input pivot axis 433 and the second drive link pivot axis 421 may be parallel to a line 562 extending orthogonally between the main pivot axis 420 and the first drive link pivot axis 419.

As a result of this geometry, and in a manner similar to that of the system 300 already described herein, the drive link 428 may accommodate pivoting of the platform 112 without imparting any unintended displacement to the input arm 432 of the pump. Thus, the platform 112/cutting deck 114 may be moved to any available height without altering the position of the pump input arm 432. The linkage system may therefore maintain, as the platform 112 is moved between its first and second positions, both the position of the input member 432 relative to the drive unit 110, and a position of the control link 412 (as well as the control lever 402) relative to the chassis 102.

While the control system is shown in the neutral position in FIG. 15, the same result may occur regardless of the position of the drive control lever 402. For instance, placement of the drive control lever 402 in the second (e.g., forward) or engaged position (broken lines in FIG. 5) with the platform 112 at its lowest setting as shown in FIG. 16 would result in positioning the pump input arm 432 in the same location as it is positioned when the platform is at its highest setting (see FIG. 14). In fact, the platform 112 could even be repositioned during operation (while the control handles remain in a given position) without any effect on pump input/mower speed.

The system 400 may offer several advantages. For instance, like the system 300, it may achieve mechanical interconnection of the control handles to the pumps without the use of cables, the latter which may require periodic adjustment/maintenance. Further, adjustment of the pump input arm 432 of the system 400 relative to the corresponding drive control lever 402 may be accomplished with a single adjustment to the length of the second reference link 448 rather than multiple adjustments required with other systems. Accordingly, both manufacturing and maintenance tasks may be simplified. Moreover, the adjustability of the second reference link 448 may allow less stringent manufacturing tolerances during vehicle manufacture.

Embodiments of the instant application may therefore provide a motion control system and vehicle incorporating the same. Control systems configured in accordance with embodiments of the present invention may include a linkage for accurately adjusting a parameter (e.g., velocity) of the vehicle even as a geometric relationship between an input (e.g., velocity control lever) and an output (e.g., drive train) of the vehicle is modified. Other embodiments may further address velocity limiting mechanisms, illustrative embodiments of which are described herein, that may be used in conjunction with, or independently of, the exemplary motion control system. Still other configurations could incorporate elements of a control system in accordance with embodiments described herein at or near the control area to permit adjustment (e.g., change in elevation) of the location of the drive control levers.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A vehicle, comprising:
a chassis;
a platform suspended from the chassis;
a platform displacement mechanism configured to move the platform, relative to the chassis, between a first position and a second position;
a variable drive unit mounted to the platform and comprising an input member movable, relative to a housing of the drive unit, between a first position and a second position;
a control lever attached to the chassis and operatively connected to the drive unit, the control lever configured to vary a position of the input member relative to the housing, the control lever movable incrementally between a first position corresponding to the first position of the input member, and a second position corresponding to the second position of the input member; and
a control linkage system comprising:
a pivot link associated with the chassis and configured to pivot, relative to the chassis, about a main pivot axis;
a control link comprising: a first end connected to the pivot link; and a second end connected to the control lever; and
a drive link comprising: a first end pivotally connected to the pivot link at a first drive link pivot; and a second end pivotally connected to the input member at a second drive link pivot;
wherein, the linkage system is configured to maintain, as the platform is moved between its first and second positions, both a position of the input member relative to the drive unit, and a position of the control link relative to the chassis.

2. The vehicle of claim 1, wherein the input member is pivotable relative to the housing of the drive unit about an input pivot axis.

3. The vehicle of claim 2, wherein the control linkage system further comprises a first reference link having a first end pivotally connected to the pivot link for pivoting about the main pivot axis, and a second end pivotally connected to the platform at a first reference pivot such that it is pivotable about a first reference pivot axis that is coincident with the input pivot axis.

4. The vehicle of claim 2, wherein the control linkage system further comprises a second reference link comprising a first end pivotally connected to the pivot link for pivoting about the main pivot axis, and a second end pivotally connected to the chassis at a second reference pivot such that it is also pivotable about a second reference pivot axis.

5. The vehicle of claim 4, wherein a length of the second reference link is adjustable.

6. The vehicle of claim 3, wherein a linear distance between an axis of the first drive link pivot and an axis of the second drive link pivot is equal to a linear distance between the first reference pivot axis and the main pivot axis.

7. The vehicle of claim 3, wherein a line extending orthogonally between the input pivot axis and an axis of the second drive link pivot is parallel to a line extending orthogonally between the main pivot axis and an axis of the first drive link pivot.

8. A vehicle, comprising:
a chassis supported by one or more drive wheels;
a platform suspended from the chassis;
a platform lift mechanism configured to raise and lower the platform, relative to the chassis, between a first position and a second position;
a variable drive unit attached to the platform and comprising an input arm pivotable, relative to a housing of the drive unit about an input pivot axis, between a first position and a second position;
a prime mover attached to either the platform or the chassis and operatively coupled to the drive unit to provide power to the same;
a control lever attached to the chassis and operatively connected to the drive unit, the control lever configured to vary a position of the input arm relative to the housing of the drive unit, the control lever movable incrementally between a first position corresponding to the first position of the input arm, and a second position corresponding to the second position of the input arm; and
a drive motion control linkage system comprising:
a bellcrank supported for pivoting relative to the chassis about a main pivot axis, the bellcrank comprising a first arm and a second arm;
a control link having a first end connected to the first arm at a control link pivot, and a second end connected to the control lever; and
a drive link comprising: a first end pivotally connected to the second arm of the bellcrank at a first drive link pivot for pivoting about a first drive link pivot axis; and a second end pivotally connected to the input arm at a second drive link pivot for pivoting about a second drive link pivot axis.

9. The vehicle of claim 8, wherein the linkage system further comprises:
a first reference link comprising a first end pivotally connected to the bellcrank for pivoting about the main pivot axis, and a second end pivotally connected to the platform at a first reference pivot such that it is pivotable about a first reference pivot axis; and a second reference link comprising a first end pivotally connected to the bellcrank for pivoting about the main pivot axis, and a second end pivotally connected to the chassis at a second reference pivot such that it is pivotable about a second reference pivot axis.

10. The vehicle of claim 9, wherein a location of the main pivot axis is defined by an intersection of the first ends of both the first and second reference links.

11. The vehicle of claim 9, wherein a length of the second reference link is adjustable.

12. The vehicle of claim 9, wherein a line extending orthogonally between the main pivot axis and the first reference pivot axis is parallel to a line extending orthogonally between the first drive link pivot axis and the second drive link pivot axis.

13. The vehicle of claim 8, wherein the platform lift mechanism comprises one or more platform bellcranks each pivotally attached to: the chassis at a platform chassis pivot for pivoting about a platform chassis pivot axis; and to the platform at a platform pivot for pivoting a platform pivot axis, wherein a linear distance between the platform chassis pivot axis and the platform pivot axis is equal to a linear distance between the first drive link pivot axis and the second drive link pivot axis.

14. The vehicle of claim 13, wherein a line extending orthogonally between the platform chassis pivot axis and the platform pivot axis is parallel to a line extending orthogonally between the first drive link pivot axis and the second drive link pivot axis.

15. The vehicle of claim 8, wherein a linear distance between the input pivot axis and the second drive link pivot axis is equal to a linear distance between the main pivot axis and the first drive link pivot axis.

16. The vehicle of claim 8, wherein a line extending orthogonally between the input pivot axis and the second drive link pivot axis is parallel to a line extending orthogonally between the main pivot axis and the first drive link pivot axis.

17. A lawn mowing vehicle, comprising:
a chassis;
transversely opposing first and second drive wheels coupled to the chassis;
a platform suspended from the chassis;
a platform lift mechanism configured to move the platform, relative to the chassis, between a first position and a second position;
first and second variable drive units attached to the platform and operatively coupled to the first and second drive wheels, respectively, wherein each drive unit comprises an input arm pivotable, about an input pivot axis, between a first position and a second position;
a prime mover attached to either the platform or the chassis and operatively coupled to both the first and second variable drive units to provide power to the same;
first and second drive control levers pivotally attached to the chassis and coupled to, and operable to independently vary a position of, the input arm of the first and second variable drive units, respectively, each control lever movable incrementally between a first position corresponding to the first position of its respective input arm, and a second position corresponding to the second position of its respective input arm; and
a drive motion control linkage system comprising:
first and second bellcranks each supported by the chassis and each operable to pivot, relative to the chassis, about a main pivot axis;
first and second control links each comprising: a first end connected to the first and second bellcranks, respectively; and a second end connected to the first and second drive control levers, respectively; and
first and second drive links each comprising: a first end pivotally connected, at a first drive link pivot, to the first and second bellcranks, respectively, and a second end connected to the input arm, at a second drive link pivot, of the first and second variable drive units, respectively.

18. The vehicle of claim 17, wherein the control linkage system further comprises a first reference link comprising: a first end pivotally connected to and pivotable about the main pivot axis of the first bellcrank; and a second end pivotally connected to the platform and pivotable about a first reference pivot axis that is coincident with the input pivot axis of the first variable drive unit.

19. The vehicle of claim 17, wherein the control linkage system further comprises a second reference link comprising: a first end pivotally connected to and pivotable about the main pivot axis of the first bellcrank; and a second end pivotally connected to the chassis and pivotable about a second reference pivot axis.

20. The vehicle of claim 19, wherein a length of the second reference links is adjustable.

* * * * *

UNITED STATES PATENT AND TRADEMARK OFFICE
CERTIFICATE OF CORRECTION

PATENT NO. : 8,104,552 B2
APPLICATION NO. : 13/082933
DATED : January 31, 2012
INVENTOR(S) : Papke et al.

It is certified that error appears in the above-identified patent and that said Letters Patent is hereby corrected as shown below:

Title Page, Item (56)
Please enter the following documents under "References Cited"

Under "U.S. Patent Documents" please add:

| | | |
|---|---|---|
| 4,558,558 | 12/17/1985 | Horner, Jr. et al. |
| 5,511,367 | 04/30/1996 | Powers et al. |
| 5,848,520 | 12/15/1998 | Arfstrom et al. |
| 6,782,964 | 08/31/2004 | Korthals et al. |
| 7,458,588 | 12/02/2008 | Kallevig |
| 7,857,089 | 12/28/2010 | Sugden et al. |

Under "Other Documents" please add:

"Peaucellier-Lipkin linkage" Wikipedia, [online]; [retrieved on September 24, 2010] from the Internet. Retrieved from the Internet:<URL:http://en.wikipedia.org/wiki/Peaucellier-Lipkin_linkage>, 3pgs.

"Stander® ZK Commercial Mower Owner's Manual – For Stander ZK Serial # 43106 and higher until superseded," Wright Manufacturing, Inc., May 2008, 20 pgs.

"Stander® ZK Commercial Mower Owner's Manual – For Stander ZK Serial # 46090 and higher until superseded," Wright Manufacturing, Inc., October 2008, 20 pgs.

Signed and Sealed this
Third Day of April, 2012

David J. Kappos
*Director of the United States Patent and Trademark Office*